United States Patent
Giansiracusa et al.

(10) Patent No.: US 9,537,808 B1
(45) Date of Patent: Jan. 3, 2017

(54) COMMUNICATION BETWEEN PERIPHERAL DEVICE AND CLIENT DEVICE

(71) Applicant: KYOCERA Document Solutions Inc., Osaka (JP)

(72) Inventors: Gail Giansiracusa, Sunnyvale, CA (US); Timmy Mann, Dublin, CA (US)

(73) Assignee: KYOCERA Document Solutions, Inc. (JP)

(*) Notice: Subject to any disclaimer, the term of this patent is extended or adjusted under 35 U.S.C. 154(b) by 0 days.

(21) Appl. No.: 14/798,593

(22) Filed: Jul. 14, 2015

(51) Int. Cl.
| | |
|---|---|
| G06F 13/00 | (2006.01) |
| H04L 12/58 | (2006.01) |
| G06F 13/38 | (2006.01) |
| H04L 29/06 | (2006.01) |
| G06F 15/00 | (2006.01) |

(52) U.S. Cl.
CPC ............. H04L 51/18 (2013.01); G06F 13/387 (2013.01); H04L 69/161 (2013.01)

(58) Field of Classification Search
CPC .................................. G06F 13/00; G06F 15/00
USPC .......................... 710/313–315; 709/230, 250
See application file for complete search history.

(56) References Cited

U.S. PATENT DOCUMENTS

| | | | | |
|---|---|---|---|---|
| 5,740,374 A | * | 4/1998 | Raffali-Schreinemachers | |
| | | | | H04L 69/08 |
| | | | | 370/360 |
| 6,529,927 B1 | * | 3/2003 | Dunham | G06F 17/10 |
| | | | | 708/400 |
| 7,093,008 B2 | | 8/2006 | Agerholm et al. | |
| 7,296,079 B2 | | 11/2007 | Motoyama et al. | |
| 7,606,884 B2 | | 10/2009 | Palmer et al. | |
| 7,814,228 B2 | * | 10/2010 | Caronni | H04L 29/00 |
| | | | | 709/245 |
| 7,966,414 B2 | * | 6/2011 | Cinghita | H04L 12/18 |
| | | | | 370/254 |
| 2004/0111535 A1 | * | 6/2004 | Boucher | G06F 5/10 |
| | | | | 709/250 |
| 2005/0078824 A1 | * | 4/2005 | Malinen | H04L 63/08 |
| | | | | 380/247 |
| 2006/0090195 A1 | * | 4/2006 | Pearson | H04L 67/02 |
| | | | | 726/3 |
| 2007/0283001 A1 | * | 12/2007 | Spiess | H04L 12/2602 |
| | | | | 709/224 |

(Continued)

*Primary Examiner* — Christopher Shin
(74) *Attorney, Agent, or Firm* — McDonnell Boehnen Hulbert & Berghoff LLP

(57) ABSTRACT

The present disclosure is directed to multi-protocol peripheral device communication. A method involves establishing a network connection between a management computing device and a peripheral device. The network connection utilizes a particular transport protocol. The method also involves generating, at the management computing device, a first message that represents a request for information from a peripheral device. The first message is in a format compatible with a first application protocol. The method further involves generating, at the management computing device, a second message based on the first message. The second message is in a format compatible with a second application protocol. The second application protocol is configured to communicate over the particular transport protocol. Additionally, the method involves transmitting, by the particular transport protocol, the second message from the management computing device to the peripheral device.

20 Claims, 15 Drawing Sheets

(56) References Cited

U.S. PATENT DOCUMENTS

| | | | |
|---|---|---|---|
| 2008/0034127 A1* | 2/2008 | Nishio | G06F 9/4411 710/11 |
| 2009/0097397 A1* | 4/2009 | Moreira Sa de Souza | H04L 41/0636 370/216 |
| 2009/0228627 A1* | 9/2009 | Huang | H04L 41/08 710/313 |
| 2015/0127938 A1* | 5/2015 | Chastain | H04L 63/08 713/168 |

* cited by examiner

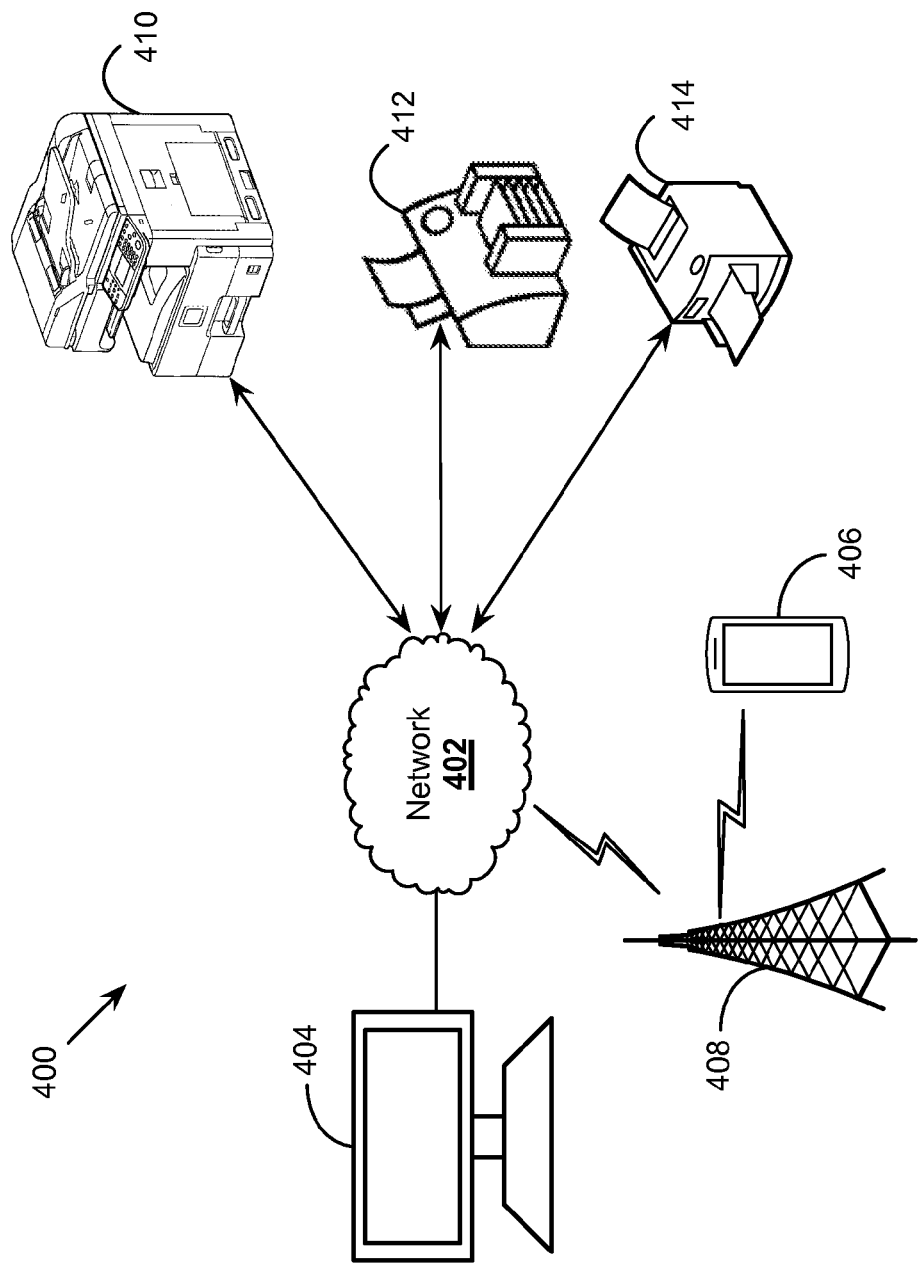

COMMUNICATION BETWEEN PERIPHERAL DEVICE AND CLIENT DEVICE

BACKGROUND

Unless otherwise indicated herein, the materials described in this section are not prior art to the claims in this application and are not admitted to be prior art by inclusion in this section.

Devices within homes, offices, and professional settings are becoming increasingly networked. Unlike offline devices, networked devices can be monitored and controlled by a separate device, allowing such networked devices to be remotely managed. Within a local network, a management device may be able to configure, control, and monitor aspects of devices connected to the network. A management device may also connect to such a local network from a separate network (e.g., via the Internet) in order to monitor and control various devices within that local network.

A typical peripheral device is configured to allow a management device to monitor and control the printing device over a specific protocol. Commonly, this protocol is the Simple Network Management Protocol (SNMP). The typical protocols utilized by printing devices are well suited for local network monitor and control. However, these protocols were not designed for messaging across networks. As a result, the typical printing device cannot easily be managed remotely.

SUMMARY

The present application discloses embodiments that relate to multi-protocol peripheral device communication. In one aspect, the present application describes a method. The method involves establishing a network connection between a management computing device and a peripheral device. The network connection utilizes a particular transport protocol. The method also involves generating, at the management computing device, a first message that represents a request for information from a peripheral device. The first message is in a format compatible with a first application protocol. The method further involves generating, at the management computing device, a second message based on the first message. The second message is in a format compatible with a second application protocol. The second application protocol is configured to communicate over the particular transport protocol. Additionally, the method involves transmitting, by the particular transport protocol, the second message from the management computing device to the peripheral device.

In another aspect, the present application describes a system. The system includes a management computing device and a peripheral device. The peripheral device is configured to perform a set of operations. The operations include establishing a network connection between the peripheral device and a management computing device. The network connection utilizes a particular transport protocol. The operations also include receiving, from the management device, a second message in a format compatible with a second application protocol. The second application protocol is configured to communicate over the particular transport protocol. The operations also include determining that the second message contains a first message embedded therein. The first message represents a request for information associated with the peripheral device. The first message is in a format compatible with a first application protocol.

The operations further include generating a third message comprising the information associated with the peripheral device upon determining that the second message contains the first message indicative of the request for information. The third message is in a format compatible with the first application protocol. Additionally, the operations include generating a fourth message based on the third message. The fourth message is in a format compatible with the second application protocol. Further, the operations include transmitting, by the particular transport protocol, the fourth message from the peripheral device to the management computing device.

In yet another aspect, the present application describes a peripheral device. The peripheral device includes a network interface, a storage device, and at least one processor. The network interface is configured to provide a network connection between the peripheral device and a management computing device. The network connection utilizes at least a particular transport protocol. The at least one processor is configured to execute instructions that cause the peripheral device to perform a set of operations. The operations include detecting one or more occurrences of operation errors on the peripheral device and responsively generating one or more first messages. The one or more first messages are in a format compatible with a first application protocol. A given first message includes information specifying a type of operation error that occurred. The operations also include storing the one or more first messages on the storage device. The operations further include generating a second message based on the one or more first messages upon receiving a request for the one or more first messages. The second message is in a format compatible with a second application protocol. The second application is configured to communicate over the particular transport protocol. Additionally, the operations include transmitting, by the particular transport protocol, the second message from the peripheral device to the management computing device.

In still another aspect, the present application describes a system. The system includes a means for establishing a network connection between a management computing device and a peripheral device. The network connection utilizes a particular transport protocol. The system also includes a means for generating, at the management computing device, a first message that represents a request for information from a peripheral device. The first message is in a format compatible with a first application protocol. The system further includes a means for generating, at the management computing device, a second message based on the first message. The second message is in a format compatible with a second application protocol. The second application protocol is configured to communicate over the particular transport protocol. Additionally, the system includes a means for transmitting, by the particular transport protocol, the second message from the management computing device to the peripheral device.

The foregoing summary is illustrative only and is not intended to be limiting. In addition to the illustrative aspects, embodiments, and features described above, further aspects, embodiments, and features will become apparent by reference to the figures and the following detailed description.

BRIEF DESCRIPTION OF THE FIGURES

FIG. 4A is a schematic diagram illustrating a system, according to an example embodiment.

DETAILED DESCRIPTION

Figure 1:
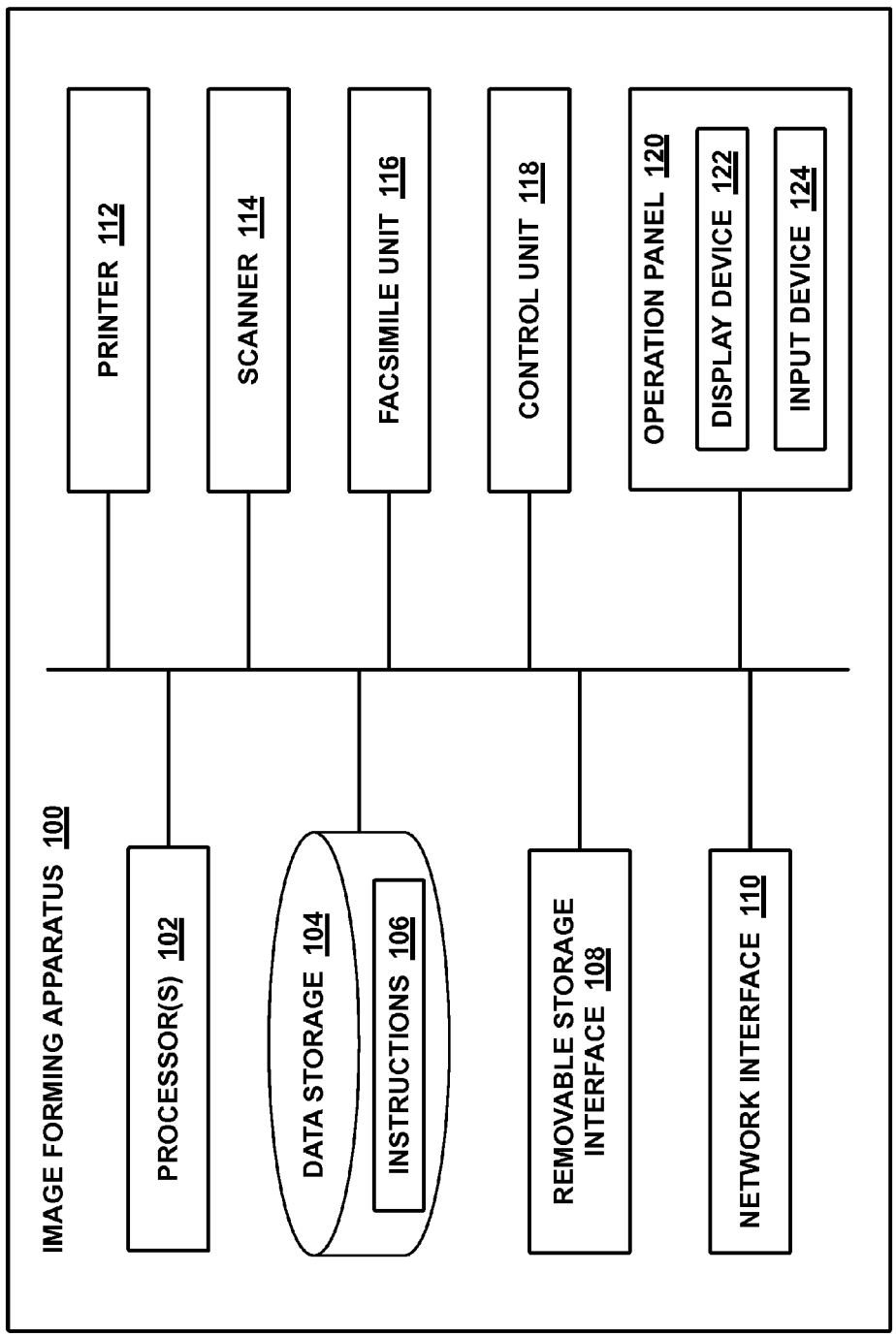
FIG. 1 is a schematic block diagram illustrating an image forming apparatus, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Example systems and peripheral devices disclosed herein enable multi-protocol messaging for improved compatibility, reliability, and remote monitoring and control. As systems grow in size and complexity, effective remote management of devices within those systems becomes increasingly important. A manufacturer of printing and/or peripheral devices may wish to provide services to clients such as remote servicing, monitoring the health and supply levels of those devices, tracking usage of those peripheral devices, and/or billing for use of those peripheral devices. In order to provide such services, the printing and/or peripheral devices may require some means of external network communication, either via built-in hardware and software or by way of a separate computing device within its local network.

A peripheral device may provide a variety of types of messages and receive a variety of commands, instructions, or requests. For example, a peripheral device may send out status messages indicating the operational health, availability, connection information, and supply levels of the peripheral device. These status messages may be sent out periodically. A peripheral device may also send out error messages to notify other devices that some type of error has occurred at the peripheral device. These error messages may be sent out in response to the occurrence of such an error.

The peripheral device may receive requests for status or other information. Upon receiving such a request, the peripheral device may respond to the requesting device with the requested-for status or other information. The peripheral device may also receive other kinds of commands or instructions that cause the peripheral device to perform various actions. Some example actions include restarting the peripheral device, configuring various aspects of the peripheral device (e.g., network settings, scanning settings, printing settings, etc.), performing service operations on the device, and/or performing test operations on the device, among other kinds of actions.

In some embodiments, a peripheral device may include hardware and/or software capable of multi-protocol communication. The peripheral device may provide both local communication and external communication. Within the local network, the peripheral device may be capable of communicating over one or more local protocols. One example local protocol that may be used is the Simple Network Management Protocol (SNMP). While SNMP is an efficient communication standard within local networks, it may be ineffective and unreliable when messaging across networks or over a wide area network, such as the Internet. The ineffectiveness of SNMP may be partially because of the unreliability of its underlying transport protocol—the User Datagram Protocol (UDP)—which is connectionless and provides no means for testing whether or not a given message was successfully transmitted.

The peripheral device may be capable of communicating across networks using one or more external protocols. One example external protocol that may be used is the Hypertext Transfer Protocol (HTTP). Unlike SNMP, HTTP utilizes the Transmission Control Protocol (TCP), which provides a connection, acknowledgement, and error-checking scheme that is more reliable than UDP.

The peripheral device may combine aspects of its local protocol messaging capabilities and its external protocol messaging capabilities in order to enable local messaging and/or external messaging. As one example, the peripheral device may implement an SNMP messaging scheme that provides local status and error messaging. A module of the peripheral device (which may be a combination of hardware and/or software) may embed or encapsulate the SNMP message within an HTTP message. The peripheral device may then transmit the HTTP message—leveraging the reliability of a TCP connection—to a remote management device. That remote management device may then extract the embedded or encapsulated SNMP message in order to determine the contents of that message.

In other embodiments, a separate conversion device communicatively situated between the peripheral device and a remote management device may perform such protocol conversion. Providing a separate conversion device may be preferred when a system has many devices capable of only local messaging. As an example set of operations, the conversion device may receive an SNMP message from a peripheral device. The conversion device may then convert, embed, encapsulate, or otherwise generate an HTTP message based on that received SNMP message. Then, the conversion device may send the HTTP message over a wide area network to a management computing device.

Multi-protocol messaging techniques of the present application may be adapted to provide a variety of other benefits. A combination of local- and external-based communication may be provided that allows for both asynchronous connectionless error notifications and synchronous connection-based messaging simultaneously. Certain messages may be sent over a serial bus connection, such as a universal serial bus (USB). Additionally, the peripheral device may be capable of dynamic port and/or protocol configuration by detecting open ports and/or compatible protocols. Further, a conversion device may collect multiple status or error messages via a local protocol over a given period of time and transmit those messages in bulk to a management device via an external protocol. In other instances, enabling communication via certain protocols—such as the Short Message Service (SMS)—may allow certain devices (such as mobile devices) to remotely interact with and manage the peripheral device.

For the purposes of this application, the protocols discussed may be related to the Internet protocol suite. This suite defines a communication model that consists of multiple layers of abstraction. One such layer is the application layer, which specifies the format of a message and the associated transport protocol, among other information. Example application layer protocols include SNMP and HTTP. Another layer is the transport layer, which provides the underlying communication mechanisms and data stream information. Example transport layer protocols include UDP and TCP. Although this application describes examples related to the Internet protocol suite model, techniques of the present application may apply to other protocol schemes not expressly discussed herein.

II. Example Image Forming Apparatuses

FIG. 1 is a schematic block diagram illustrating an image forming apparatus 100, according to an example embodiment. The image forming apparatus 100 includes processor(s) 102, data storage 104 that has stored thereon instructions 106, a removable storage interface 108, a network interface 110, a printer 112, a scanner 114, a facsimile (FAX) unit 116, a control unit 118, and an operation panel 120 that includes a display device 122 and an input device 124. Each unit of image forming apparatus 100 may be connected to a bus, allowing the units to interact with each other. For example, the processor(s) 102 may request information stored on data storage 104.

The processor(s) 102 may include one or more processors capable of executing instructions, such as instructions 106, which cause the image forming apparatus 100 to perform various operations. The processor(s) 102 may include general-purpose central processing units (CPUs) and cache memory. The processor(s) 102 may also incorporate processing units for specific purposes, such as application-specific integrated circuits (ASICs) and field-programmable gate arrays (FPGAs). Other processors may also be included for executing operations particular to image forming apparatus 100.

The data storage 104 may store thereon instructions 106, which are executable by the processor(s) 102. The data storage 104 may also store information for various programs and applications, as well as data specific to the image forming apparatus 100. For example, the data storage 104 may include data for running an operating system (OS). In addition, the data storage 104 may store user data that includes various kinds of information about any number of users. The data storage 104 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 104 may include any combination of readable and/or writable volatile memories and/or non-volatile memories, along with other possible memory devices.

The removable storage interface 108 may allow for connection of external data storage, which may then be provided to the processor(s) 102 and/or the control unit 118 or copied into data storage 104. The removable storage interface 108 may include a number of connection ports, plugs, and/or slots that allow for a physical connection of an external storage device. Some example removable storage devices that may interface with image forming apparatus 100 via the removable storage interface 108 include USB flash drives, secure-digital (SD) cards (including various shaped and/or sized SD cards), compact discs (CDs), digital video discs (DVDs), and other memory cards or optical storage media.

The network interface 110 allows the image forming apparatus 100 to connect to other devices over a network. The network interface 110 may connect to a local-area network (LAN) and/or a wide-area network (WAN), such as the Internet. The network interface may include an interface for a wired connection (e.g. Ethernet) and/or wireless connection (e.g. Wi-Fi) to a network. The network interface 110 may also communicate over other wireless protocols, such as Bluetooth, radio-frequency identification (RFID), near field communication (NFC), 3G cellular communication such as CDMA, EVDO, GSM/GPRS, or 4G cellular communication, such as WiMAX or LTE, among other wireless protocols. Additionally, the network interface 110 may communicate over a telephone landline. Any combination of wired and/or wireless network interfaces and protocols may be included in network interface 110.

The printer 112 may be any device or peripheral capable of producing persistent human-readable images and/or text on a printing medium, such as paper. The printer 112 may receive print data from other units of image forming apparatus 100 representing images and/or text for printing. The printer 112 may employ a variety of technologies, such ink-based printing, toner-based printing, and thermal printing, among other technologies. An assortment of mechanical and/or electro-mechanical devices may make up the printer 112 to facilitate the transportation of printing media and the transferring of images and/or text onto the printing media. For example, the printer 112 may include trays for the storage and staging of printing media and rollers for conveying the printing media through the printer 112. The printer 112 may also include ink heads for dispensing ink onto a printing medium, photosensitive drums onto which lasers are shone to charge the drums and attract toner that is transferred onto a printing medium, and/or a thermal head for heating certain areas of a printing medium to generate images and/or text. Other devices may also be incorporated within printer 112.

The scanner 114 may be any device that can scan a document, image, or other object (which may collectively be referred to as "scanning medium" hereinafter) and produce a digital image representative of that scanning medium. The scanner 114 may emit light (e.g. via LEDs) onto the scanning medium and sense the light reflecting off the scanning medium (e.g. via a charge coupled device (CCD) line sensor or a complementary metal oxide semiconductor (CMOS) line sensor). In some implementations, the scanner 114 includes a platen glass onto which a document may be placed to be scanned. In addition, the scanner 114 may perform post-processing on the scanned image, such as rotation, compression of the data, and/or optical character recognition (OCR), among other post-processing operations.

The facsimile unit 116 may scan a document and/or images (which may be collectively referred to as "printed material" hereinafter) and transmit the scanned printed material over a telephone line (i.e. fax the scanned printed material). The facsimile unit 116 may fax the scanned printed material via the network interface 110. The facsimile unit 116 may also receive a fax transmission and communicate the received data to the printer 112 for printing. In some implementations, the facsimile unit 116 includes buttons for configuring the facsimile unit 116 and dialling a phone number and a display for displaying the status of the fax transmission, among other things.

The control unit 118 may control various electrical and/or mechanical components of the image forming apparatus 100. For example, the control unit 118 may operate one or more paper sheet feeders, conveyors, rollers, and other mechanical devices for transporting paper through the printer 112. The control unit 118 may also include device drivers that facilitate network communication, electronic displays, and the reading of information from various sensors or readers coupled to the image forming apparatus 100. In some implementations, the control unit 118 is a software application or program that interfaces the processor(s) 102 with the various units of the image forming apparatus 100.

The operation panel 120 includes a display device 122 and an input device 124 for facilitating human interaction with the image forming apparatus 100. The display device 122 may be any electronic video display, such as a liquid-crystal display (LCD). The input device 124 may include any combination of devices that allow users to input information into the operation panel 120, such as buttons, a keyboard, switches, and/or dials. In addition, the input device 124 may include a touch-screen digitizer overlaid onto the display device 122 that can sense touch and interact with the display device 112.

III. Example Peripheral Device

Figure 2:
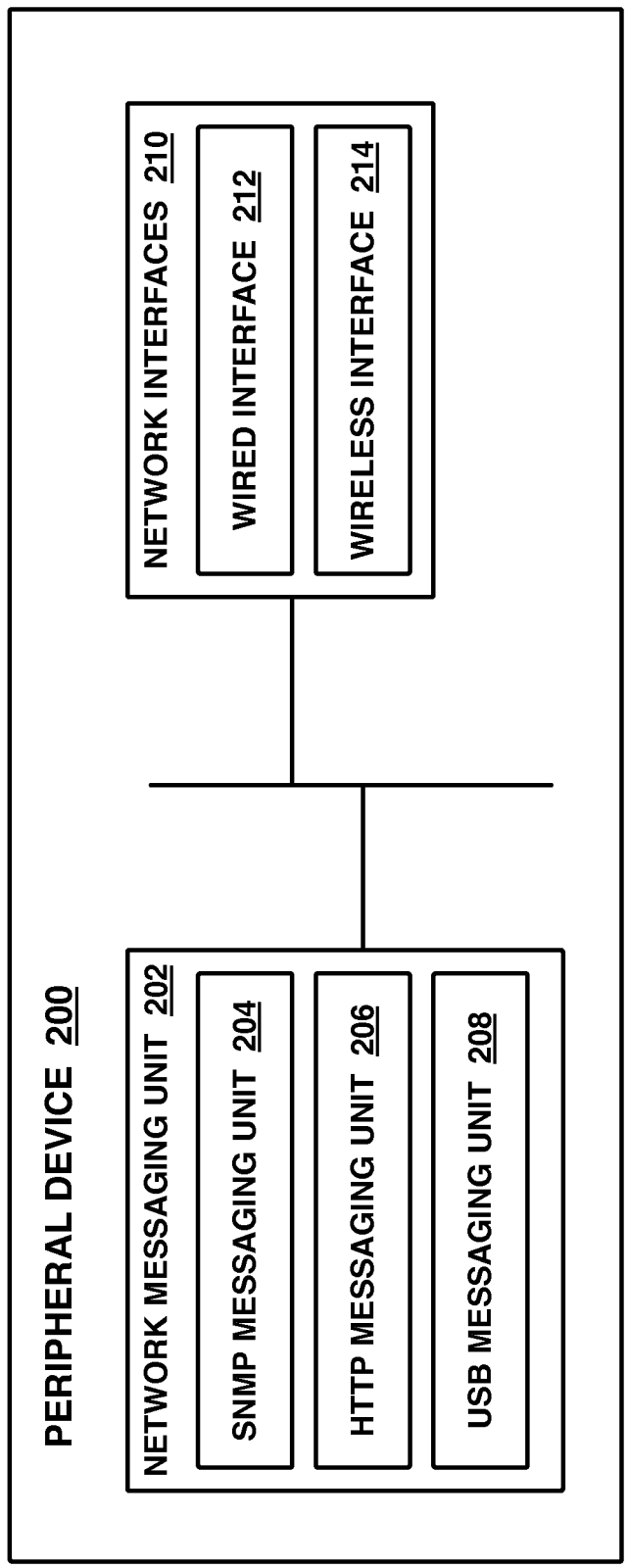
FIG. 2 is a schematic block diagram illustrating a peripheral device, according to an example embodiment.

FIG. 2 is a schematic block diagram illustrating a peripheral device, according to an example embodiment. The peripheral device 200 includes a network messaging unit 202 and network interfaces 210. The network messaging unit 202 includes an SNMP message unit 204, an HTTP messaging unit 206, and a USB message unit 208. The network interfaces 210 includes a wired interface 212 and a wireless interface 214. The peripheral device 200 may include any combination of units of image forming apparatus 100.

A "peripheral device" as described herein may refer to any auxiliary device that a user can interact and performs one or more functions and/or operations. Some example peripheral devices include a printer, a scanner, and a facsimile machine. In some instances, a peripheral device may be capable of performing multiple functions and/or operations. For example, a peripheral device may be able to print documents and scan documents. For the purposes of this application, a device capable of performing multiple functions and/or operations (e.g. at least two of printing, scanning, and facsimile transmission, among other possible functions and/or operations) may be referred to herein as a multi-function peripheral (MFP).

The network messaging unit 202 may be any combination of hardware and/or software that converts messages between two or more protocols or standards. The conversion between protocols may vary depending on the specific protocols and the particular implementation. One example "conversion" may involve embedding a message of one protocol within a message of another protocol. As one specific example, an SNMP message may be embedded within a portion of an HTTP message. In some cases, a message of one protocol may be encapsulated within the message of another protocol. Such an encapsulation may or may not adhere to the standards of a given protocol—that is, a given message may be "hacked," such that it is compatible with the protocol although the contents of the message may require special processing in order to extract the encapsulated message. Regardless of the particular implementation, the network messaging unit 202 provides a means for converting messages between or among different protocols.

As described herein, the functionality and capabilities of the network messaging unit 202 may be referred to as a "conversion device." This conversion device may be integrated within the peripheral device (as the network messaging unit 202), or it may be provided as a separate device (e.g., a server or other computing device).

The SNMP messaging unit 204 may be any combination of hardware and/or software that allows the network messaging unit 202 to convert to and from SNMP messages. The SNMP messaging unit 204 may provide the network messaging unit 202 with the set of standards defined by SNMP. The SNMP messaging unit 204 may interpret received SNMP messages and may cause the peripheral device 200 to perform one or more operations corresponding to the received message. For example, upon determining that a status request was received, the SNMP messaging unit 204 may instruct the peripheral device 200 to retrieve its status information and transmit that status information to the requesting device. In some instances, the network messaging unit may first convert the status information into a format compatible with the requesting device (e.g., if the requesting device sent HTTP, the status information in SNMP format may be embedded within an HTTP message before being sent to the requesting device).

As described herein, the "format" of the message refers to the arrangement of information in compliance with a particular protocol's standard. A given protocol may require a particular arrangement of information, headers, tags, and/or other kinds of information to be included within a message. Thus, a message "in the format" of a particular protocol adheres to the standards set forth by that particular protocol.

The HTTP messaging unit 206 may be any combination of hardware and/or software that allows the network messaging unit 202 to convert to and from HTTP messages. The HTTP messaging unit 206 may provide the network messaging unit 202 with the set of standards defined by HTTP. The HTTP messaging unit 206 may interpret received HTTP messages and may cause the peripheral device 200 to perform one or more operations corresponding to the received message. For example, upon determining that a status request was received, the HTTP messaging unit 206 may instruct the peripheral device 200 to retrieve its status information and transmit that status information to the requesting device.

The USB messaging unit 208 may be any combination of hardware and/or software that allows the network messaging unit 202 to communicate using a variety of protocols over USB. In some implementations, the USB messaging unit 208 may operate in conjunction with other units of the peripheral device 200, such as the HTTP messaging unit 206. Some embodiments may allow for HTTP messaging over a USB connection. The USB messaging unit 208 may also operate with the wired interface 212 in order to provide serial communication.

The network interfaces 210 may be any combination of hardware and/or software that enables the network messaging unit 202 to send and receive messages to external devices. The network interfaces 210 may include firmware and physical ports to provide network connections and/or other communicative data links to one or more external devices.

The wired interface 212 may be any combination of hardware and/or software that enables the network messaging unit 202 to send and receive messages over one or more wired connections. Example wired connections include Ethernet and USB, among other possible wired connections.

The wireless interface 214 may be any combination of hardware and/or software that enables the network messaging unit 202 to send and receive messages over one or more wireless connections. Example wireless connections include Wi-Fi, Wi-Fi Direct, Bluetooth, radio-frequency identification (RFID), near field communication (NFC), 3G cellular communication such as CDMA, EVDO, GSM/GPRS, or 4G cellular communication, such as WiMAX or LTE, among other wireless protocols.

A "unit" as referred to herein may refer to a device, component, module, or other combination of electrical and/or mechanical elements that accomplish a particular task. In some instances, a unit may refer to a physical device that performs certain activities, such as the facsimile unit 116. In other instances, a unit may refer to a software module that executes operations for a certain purpose, such as the graphical code identification unit 208. Regardless of the combination of hardware and software components that make up a unit, it should be understood that units are operable to accomplish certain tasks, and may interact with other units through hardware and/or software interfaces.

Image forming apparatuses referred to herein may incorporate any combination of components from image forming apparatus 100 and/or printing device 200, among other possible components. For instance, an image forming apparatus may include a power supply that converts electrical power for use by various components. It should be understood that other additional components might also be included on a particular image forming apparatus.

IV. Example Management Computing Device

Figure 3:
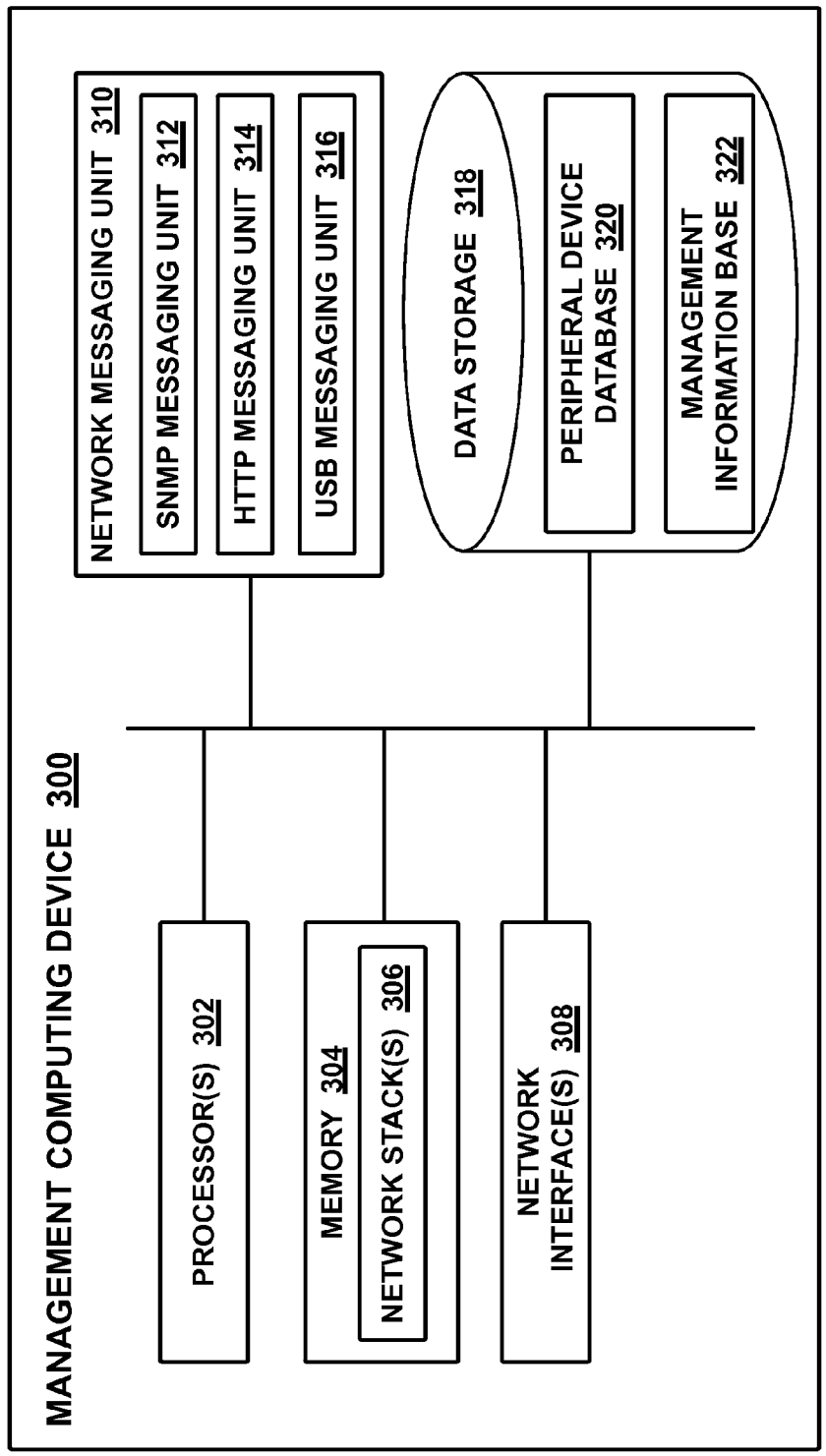
FIG. 3 is a schematic block diagram of a management computing device, according to an example embodiment.

FIG. 3 is a schematic block diagram of a management computing device 300, according to an example embodiment. The management computing device 300 includes processor(s) 302, memory 304, network interface(s) 308, network messaging unit 310, and data storage 318. Memory 304 includes network stack(s) 306. The network messaging unit 310 includes an SNMP messaging unit 312, an HTTP messaging unit 314, and a USB messaging unit 316. The data storage 318 includes a peripheral device database 320 and a management information base 322.

The processor(s) 302 may include one or more processors capable of executing software which cause the management computing device 300 to perform various operations. The processor(s) 302 may include general-purpose central processing units (CPUs) and cache memory. The processor(s) 302 may also incorporate processing units for specific purposes, such as application-specific integrated circuits (ASICs) and field-programmable gate arrays (FPGAs). Other processors may also be included for executing operations particular to management computing device 300.

The memory 304 may be any volatile storage device—such as random-access memory (RAM)—that provides a temporary storage location and memory space for software executed on the management computing device 300.

The network stack(s) 306 may be a portion of the memory 304 designated for temporary storage of messages received at the management computing device 300. Messages may be stored within network stack(s) 306 until the processor(s) 302 processes the messages and determines actions to take based on those messages.

The network interface(s) 308 may be any combination of wired Ethernet, Wi-Fi (e.g. 802.11a/b/g/n/ac operating in the 2.4 GHz and/or 5 GHz Wi-Fi bands, among other possible Wi-Fi standards), Wi-Fi Direct, Bluetooth, and/or any other wired or wireless communication standard. The network interface(s) may provide communicative connections to printing devices and peripheral devices within a particular network. The management computing device 300 may connect to a local network through the network interface(s) 308. In some implementations, a printing device or peripheral device may communicate directly to the management computing device 300 over Wi-Fi Direct or Bluetooth, without being connected to such a local network.

The network messaging unit 310 may be similar to or the same as network messaging unit 202. The network messaging unit 310 may provide a means for converting a message of one protocol into the format of another protocol. The network messaging unit 310 may also communicate with the peripheral device database 320 in order to determine which protocol or protocols a given peripheral device is capable of receiving. The network messaging unit 310 may also include messaging units for other protocols, such as SMTP, IMAP, Telnet, POP, and SSH, among other possible network protocols.

The SNMP messaging unit 312 may be similar to or the same as SNMP messaging unit 204. The SNMP messaging unit 312 may also communicate with the management information base 322 when generating SNMP-based messages and/or when interpreting SNMP-based messages received at the management computing device 300.

The HTTP messaging unit 314 may be similar to or the same as HTTP messaging unit 206. The HTTP messaging unit 314 may also communicate with the peripheral device database in order to retrieve information associated with a particular peripheral device, such as its IP address or other destination identifier.

The USB messaging unit 316 may be similar to or the same as USB messaging unit 208. The USB messaging unit 316 may also communicate with the peripheral device database 322 in order to determine an identifier of the peripheral device. The USB messaging unit 316 may direct messages to a particular device using its associated identifier.

The data storage 318 may store thereon instructions, which are executable by the processor(s) 302. The data storage 318 may also store information for various programs and applications, as well as data specific to the management computing device 300. For example, the data storage 318 may include data for running an operating system (OS). In addition, the data storage 318 may store user data that includes various kinds of information about any number of users. The data storage 318 may include both volatile memory and non-volatile memory. Volatile memory may include random-access memory (RAM). Some examples of non-volatile memory include read-only memory (ROM), flash memory, electrically erasable programmable read only memory (EEPROM), digital tape, a hard disk drive (HDD), and a solid-state drive (SSD). The data storage 318 may include any combination of readable and/or writable volatile memories and/or non-volatile memories, along with other possible memory devices.

The peripheral device database 320 may store information associated with one or more peripheral devices. Some information that may be stored within peripheral device database 320 includes a peripheral device's IP address, bus location, MAC address, serial number, customer information, among other kinds of information. Regardless of the particular information stored, the peripheral device database 320 may provide information to facilitate communication with one or more peripheral devices. Other information that may also be stored within peripheral device database 320 for a given peripheral device may include previous status information, recent error messages, a set of commands receivable by the peripheral device, and/or billing information associated with the peripheral device.

The management information base 322 may store information used by the network messaging unit 310 in order to decipher or interpret received messages, as well as to generate messages compatible with a peripheral device. Certain protocols—such as SNMP—may allow for customized mappings between data values and message types. For example, a particular SNMP scheme for a printing device may associate an arbitrary number (e.g., error code 13) with a certain type of message (e.g., paper jam error). The management information base 322 may store these message value-to-type designations for one or more printing devices and/or peripheral devices. Upon receiving an SNMP message (or a message within which an SNMP message is embedded or encapsulated), the network messaging unit 310 may access the management information base 322 in order to interpret the message. When sending a command, instruction, or request to a peripheral device, the network messaging unit 310 may access the management information base 322 in order to generate a message that can be understood by that peripheral device.

The management computing device 300 may be any kind of computing device, client device, server, or mobile computing device. Depending on the specific embodiment, the management computing device 300 may include some, but not all, of the units depicted in FIG. 3.

V. Example Systems

FIG. 4A is a schematic diagram illustrating a system 400, according to an example embodiment. The system 400 includes a client device 404, a mobile computing device 406, a first peripheral device 410, a second peripheral device 412, and a third peripheral device 414. Each device is communicatively connected to each other by way of network 402. The mobile computing device 406 communicatively connects to the network 402 via mobile station 408.

The network 402 may be a local area network, a wide area network, or a combination thereof. In some embodiments, the client device 404 and the peripheral devices 410, 412, and 414 may all be connected to the same local area network. In another embodiment, the client device 404 is a remote computing device that connects to the one or more peripheral devices 408, 410, and 412 over a wide area network, such as the Internet. It should be understood that the network 402 may be any type of network communication medium through which the devices within system 400 may communicate, transmit, and/or receive information.

The client device 404 may be any computing device capable of sending requests, commands, instructions, or other information to and receiving responses from various devices within the network, such as the peripheral devices 408, 410, and 412. The client device 404 may be similar to or the same as the management computing device 300, and may include one or more units of the management computing device 300.

The mobile computing device 406 may be a cell phone, a smartphone, or tablet device wirelessly connected to the mobile station 408. The wireless connection between mobile computing device 406 and the mobile station 408 may utilize one or more of a variety of communication standards, including GSM, EDGE, CDMA, 3GPP, WiMAX, and/or LTE, among other possible communication standards. The mobile computing device 406 may be communicatively connected to the network 402 via the mobile station 408. The mobile computing device 406 may behave similarly to and/or include capabilities of the client device 404. The mobile computing device 406 may transmit messages through the network 402 to one or more of the peripheral devices 410, 412, 414 using one or more communication protocols, including SMS and HTTP, among other possible communication protocols.

The mobile station 408 may be a cellular tower, micro cell, or other wireless communication station to which mobile devices are communicatively connected. The mobile station 408 may provide a cellular network that provides one or more mobile phone communication standards, including GSM, EDGE, CDMA, 3GPP, WiMAX, and/or LTE, among other possible communication standards. The mobile station 408 may connect to the network 402 via a wired connection or a wireless connection.

The first peripheral device 410, second peripheral device 412, and third peripheral device 414 may be devices capable of printing, scanning, and/or faxing, among other possible capabilities. A given peripheral device may be capable of sending and/or receiving messages using one or more communication protocols. As one example, the second peripheral device 412 may be configured to transmit status messages over SNMP. As another example, the first peripheral device 410 may be configured to send and receive messages over SNMP and HTTP. Each of the peripheral devices may connect to network 402 via a wired connection and/or a wireless connection.

It should be understood that the system 400 is an example system that is provided for explanatory purposes. Any number of mobile devices, computers, laptops, printing devices, peripheral devices, and/or other terminal apparatuses may be present within the system 400.

Figure 4B:
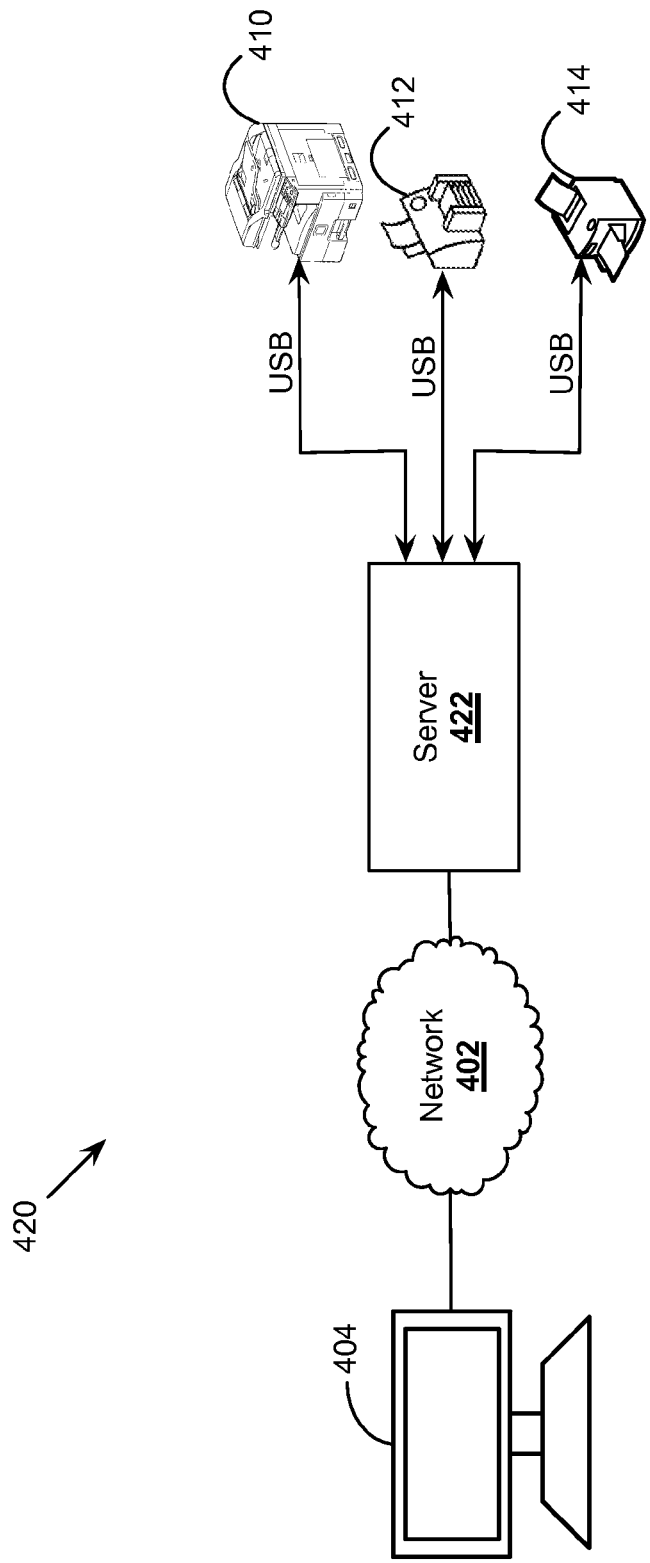
FIG. 4B is a schematic diagram illustrating a system, according to an example embodiment.

FIG. 4B is a schematic diagram illustrating a system 420, according to an example embodiment. The system 420 includes client device 404, server 422, first peripheral device 410, second peripheral device 412, and third peripheral device 414. The client device 404 and server 422 are communicatively connected by way of network 402. The peripheral devices 410, 412, and 414 are each communicatively connected to the server 422 via USB connections.

The server 422 may be a computing device that implements at least some of the functionality and capabilities of a conversion device. The server 422 may receive messages from peripheral devices 410, 412, and 414. In some instances, the server 422 may store these messages onto a storage device of the server 422. Then, the server 422 may transmit one or more of those messages to client device 404 via network 402. The server 422 may perform this transmission periodically, and/or in response to receiving a request for the messages from client device 404.

In some embodiments, server 422 is not connected to network 402, or any other local area network or wide area network. For example, server 422 may be present within a home environment and connected to the peripheral devices 410, 412, and 414 via USB. As another example, the server 422 may be present within a print farm (i.e., a large facility containing many printing devices) and connected to each of the peripheral devices within that print farm via USB. In these examples, a user or administrator may access the server 422 locally (e.g., over a local Wi-Fi, a local web interfaced accessed from the server's IP address, and/or via an operation panel of the server 422, among other possibilities) to view status information, monitor the health of the peripheral devices, and control or configure various peripheral devices within the system. Note that, in these embodiments, all of the management information and status messages are sent among the server and connected peripheral devices; no exchange of data to an external device or through a network is performed in these examples.

It should be understood that the system 420 is an example system that is provided for explanatory purposes. Any number of mobile devices, computers, laptops, printing devices, peripheral devices, and/or other terminal apparatuses may be present within the system 420. Depending upon the particular implementation, a system may include portions of system 400 and system 420.

VI. Example Methods

Figure 5:
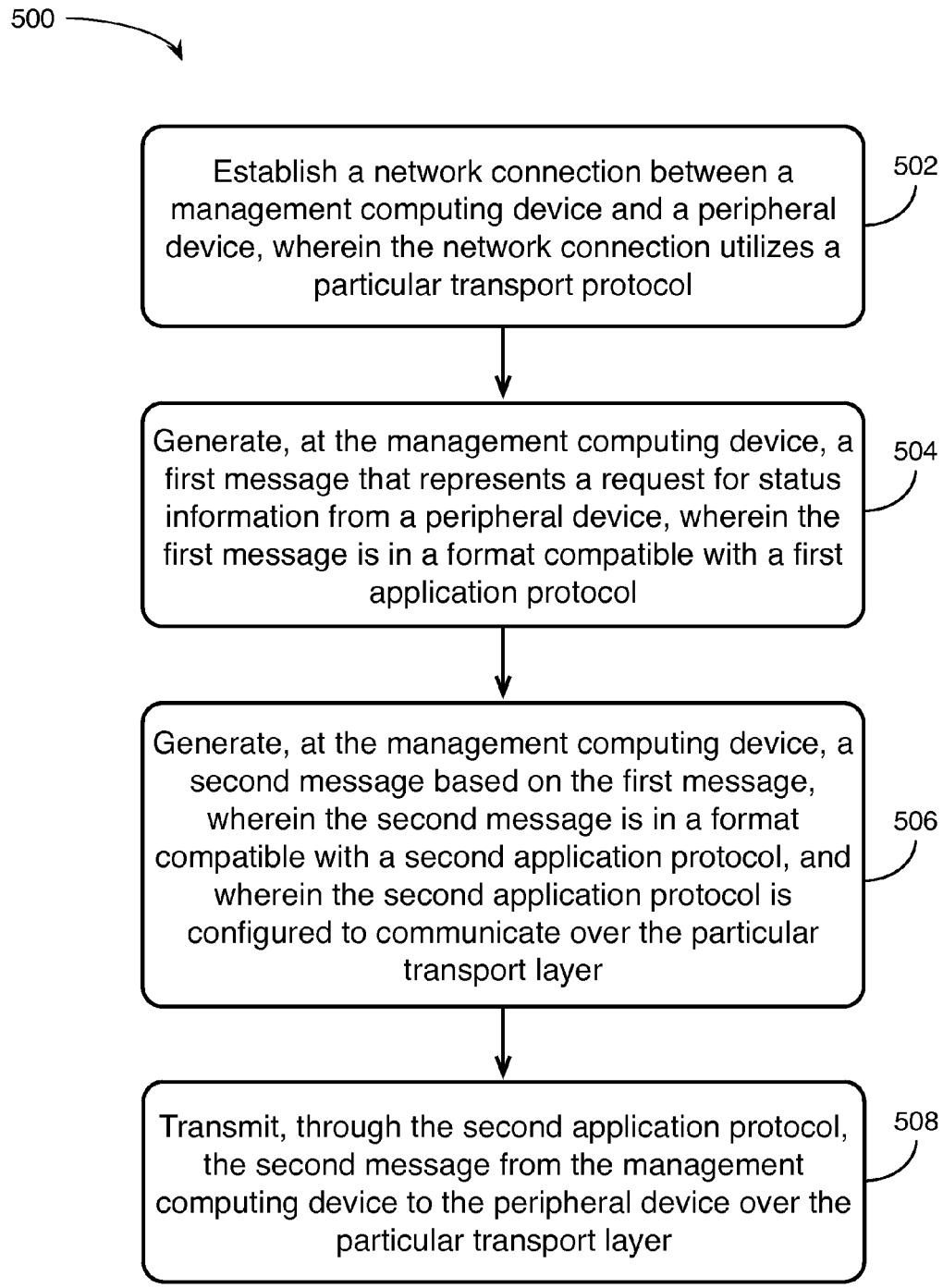
FIG. 5 is a flowchart illustrating a method, according to an example embodiment.

FIG. 5 is a flowchart illustrating a method 500, according to an example embodiment. The method 500 may be one example set of operations that collectively performs multi-protocol communication of the present application. Operations of method 500 may be performed on a computing device, such as the management computing device 300 of FIG. 3. The method 500 may be performed within system 400 of FIG. 4A and/or within system 420 of FIG. 4B.

At step 502, the method 500 involves establishing a network connection between a management computing device and a peripheral device. The network connection may be established by a particular transport protocol (e.g., TCP). The particular transport protocol may perform a "handshake" technique of exchanging requests and acknowledgements in order to establish the network connection. After the network connection has been established (i.e., opened), data messages may be transmitted between the devices.

At step 504, the method 500 involves generating, at the management computing device, a first message that represents a request for status information from a peripheral device. In some cases, the peripheral device may be configured to provide status information within a first application protocol. The management computing device may have knowledge of the peripheral device's communication capabilities (e.g., stored within the peripheral device database 320). Accordingly, the management computing device may generate the first message in a format compatible with the first application protocol. The management computing device may determine the content of the first message based on the communication scheme specified by the management information base 322.

As a specific example, the peripheral device may be configured to communicate status information over SNMP. The management computing device may generate an SNMP request for status information. In some implementations, the SNMP message may include a data value that specifies that the message is a request for status information; the management information base 322 may include such data value-message type mappings.

At step 506, the method 500 involves generating, at the management computing device, a second message based on the first message. Step 506 may involve embedding, encapsulating, or otherwise generating an HTTP message based on the SNMP message. In some cases, the HTTP message may embed the SNMP message data therein. In other cases, the HTTP message may include information that specifies the information of the SNMP message in a different form; for example, the HTTP message may use text to represent the values of the fields of the SNMP message. Regardless of the particular implementation, the management computing device may generate an HTTP message that includes the SNMP message information therein, such that the SNMP message can be later read, decoded, or otherwise extracted from the HTTP message by the peripheral device. The resulting second message is in a format compatible with second application protocol; for example, the second message may be in the format readily compatible with the HTTP application protocol.

At step 508, the method 500 involves transmitting, through the second application protocol, the second message from the management computing device to the peripheral device over the particular transport layer. The management computing device may transmit the second message over a connection-based transport protocol, such as TCP. The network connection established in step 502 may be used to transmit the HTTP message from the management computing device to the peripheral device.

Although the steps 502, 504, 506, and 508 are depicted in FIG. 5 as being performed in series, one or more of the steps may be performed in parallel. Additionally, the steps may be performed in a different order than that shown in FIG. 5. It should be understood that, while the example method 500 depicted in FIG. 5 is described as utilizing SNMP, HTTP, and TCP protocols, other application and/or transport protocols may be used.

FIGS. 6A-6I depict data flow diagrams illustrating example scenarios in which multi-protocol communication of the present application may be used. The system through which the data passes in the scenarios shown in FIGS. 6A-6I may include some combination of a management computing device 602, a conversion device 604, a peripheral device 606, a server 632, and a mobile computing device 682. The management computing device 602 may be similar to the management computing device 300 of FIG. 3. The conversion device 604 may be similar to the network messaging unit 202 of peripheral device 200 shown in FIG. 2. The peripheral device 606 may be similar to the peripheral device 200 shown in FIG. 2. The various devices illustrated in FIGS. 6A-6I may be arranged in a similar manner to the devices shown in system 400 of FIG. 4A and/or system 420 in FIG. 4B.

Figure 6A:
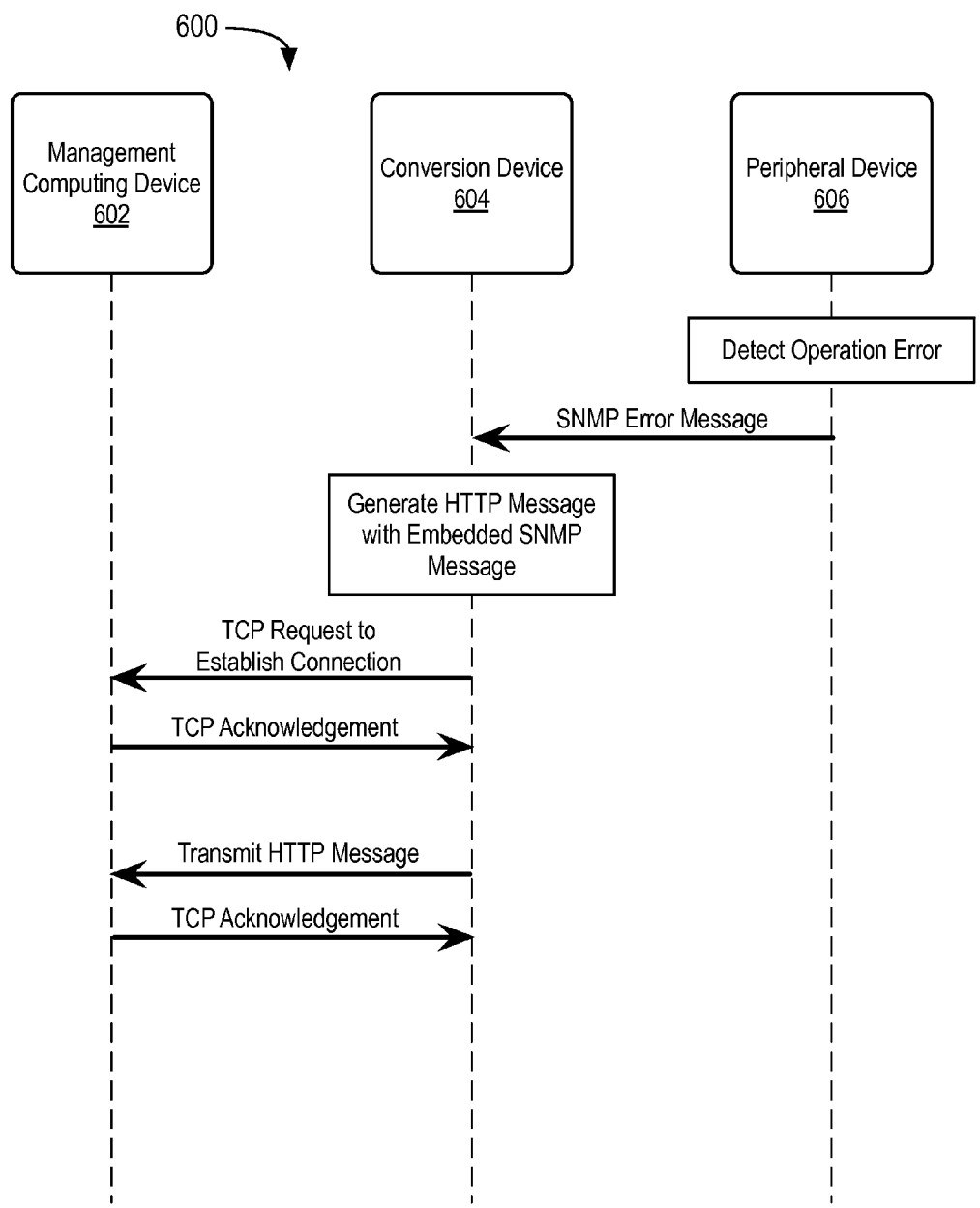
FIG. 6A is a data flow diagram illustrating an example operation of sending SNMP messages using HTTP, according to an example embodiment.

FIG. 6A is a data flow diagram 600 illustrating an example operation of sending SNMP messages using HTTP, according to an example embodiment. In this example, an operation error occurs on the peripheral device 606, which is communicated to the management computing device 602 over HTTP through a TCP connection.

First, the peripheral device 606 detects an operation error and transmits an SNMP error message to the conversion device 604. The operation error may be any kind of error with electronic or mechanical components within the peripheral device, resulting in a failure to perform or complete an operation. Some operation errors include paper jams in printing devices, low supply levels (e.g., ink, toner, paper, etc.), memory issues, and/or issues with various mechanical components within a peripheral device, among other operation errors.

The SNMP error message may be a data packet in a format compatible with the SNMP protocol. An SNMP message may contain a set of data values that specify various aspects of the data message, such as the IP address header, the UDP header, the type of message, and error-checking values, among other data values. Some SNMP messages may be referred to as protocol data units (PDUs). Some example PDUs that may be sent from a management computing device to a peripheral device include "GetRequest" (requesting information from the peripheral device) and "SetRequest" (configuring some aspect of the peripheral device), among other types of PDUs. An example PDU that may be sent from a peripheral device to a management computing device includes a "Trap" (a notification sent containing information that wasn't explicitly requested). An error message sent from the peripheral device 606 in response to detecting an occurrence of an operation error may be a "Trap" SNMP PDU. A given PDU may contain a set of bits that represent the data values of the SNMP message. These bits may be interpreted using a management information base, as described above.

In implementations where the conversion device 604 is integrated within the peripheral device 606, the SNMP error message may be sent via a bus or other internal form of communication. In implementations where the conversion device 604 and the peripheral device 606 are separate devices, the SNMP error message may be sent via a network connection via UDP.

Upon receiving the SNMP error message, the conversion device 604 generates an HTTP message with the SNMP error message embedded therein. In some embodiments, the HTTP message may embed the SNMP error message within a set of HTML tags (e.g., between "body" tags, paragraph tags, etc.). In some implementations, the HTML tags may not be tags specified by HTTP or HTML standards (e.g., between custom tags, such as "snmp"), which can be understood by the conversion device 604 and/or the management computing device 602. Regardless of the particular implementation, the SNMP error message may be encapsulated or embedded in a variety of ways, such that the original SNMP error message can be recovered or otherwise extracted from the HTTP message.

Then, the conversion device 604 establishes a TCP network connection with the management computing device 602. This step may involve the conversion device 604 transmitting a request to establish a connection (e.g., "SYN") and the management computing device 602 transmitting an acknowledgement in response to receiving the request (e.g., "SYN/ACK"). In some cases, the conversion device 604 may transmit an acknowledgement in response to receiving the acknowledgement from the management computing device 602 (e.g., "ACK").

Once the TCP network connection is established, the conversion device 604 may then transmit the HTTP message via the TCP network connection to the management computing device 602. The management computing device 602 may also transmit a TCP acknowledgement response message back to the conversion device 604, indicating that it successfully received the HTTP message.

In some scenarios, the management computing device 602 may be on a separate remote network from that of the conversion device 604 and the peripheral device 606. Because SNMP messages typically are sent using UDP, those SNMP messages may be dropped or otherwise lost. However, by embedding the SNMP messages within an HTTP message and transmitting them through a connection-based transport protocol, the SNMP messages may be more reliably transmitted.

It should be understood that the peripheral device 606 may send other SNMP messages to the conversion device in response to the occurrence of other events and/or periodically.

Figure 6B:
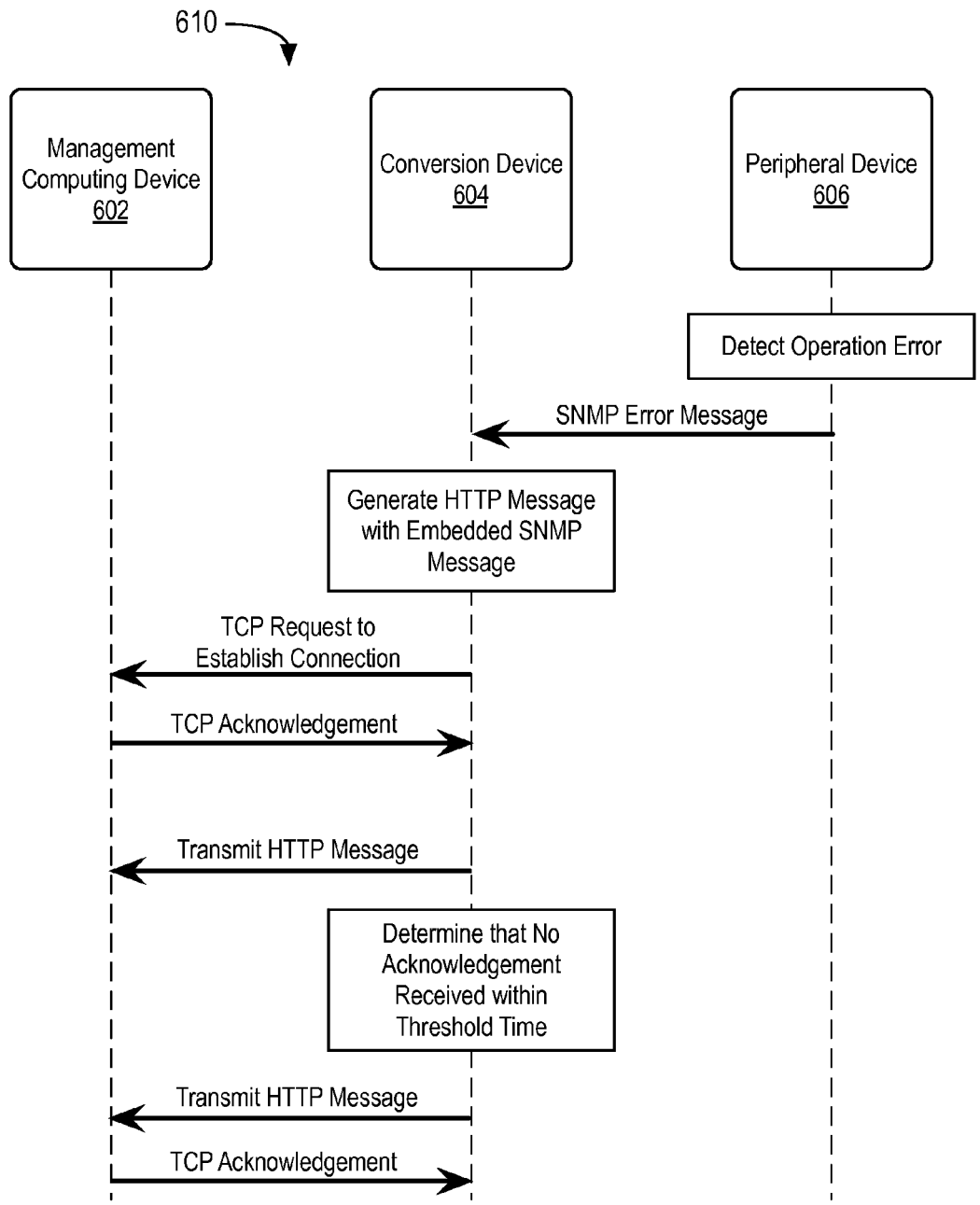
FIG. 6B is a data flow diagram illustrating another example operation of sending SNMP messages using HTTP, according to an example embodiment.

FIG. 6B is a data flow diagram 610 illustrating another example operation of sending SNMP messages using HTTP, according to an example embodiment. The operation shown in FIG. 6B is similar to that of FIG. 6A; however, the data flow diagram of FIG. 6B illustrates a scenario where a TCP transmission timeout occurs.

After transmitting the HTTP message, the conversion device 604 determines that no acknowledgement from the management computing device 602 was received within a threshold time. Because TCP is a connection-based transport protocol, successful transmission requires an acknowledgement that a data transmission was successfully received. The conversion device 604 may include a timer in order to determine the length of time elapsed since transmitting the HTTP message. After a threshold length of time (e.g. 1 second to 20 seconds, among other threshold lengths of time), if no acknowledgement has been received, the conversion device 604 retries the transmission of the HTTP message. This timeout retransmission may be performed multiple times until an acknowledgement is received.

Figure 6C:
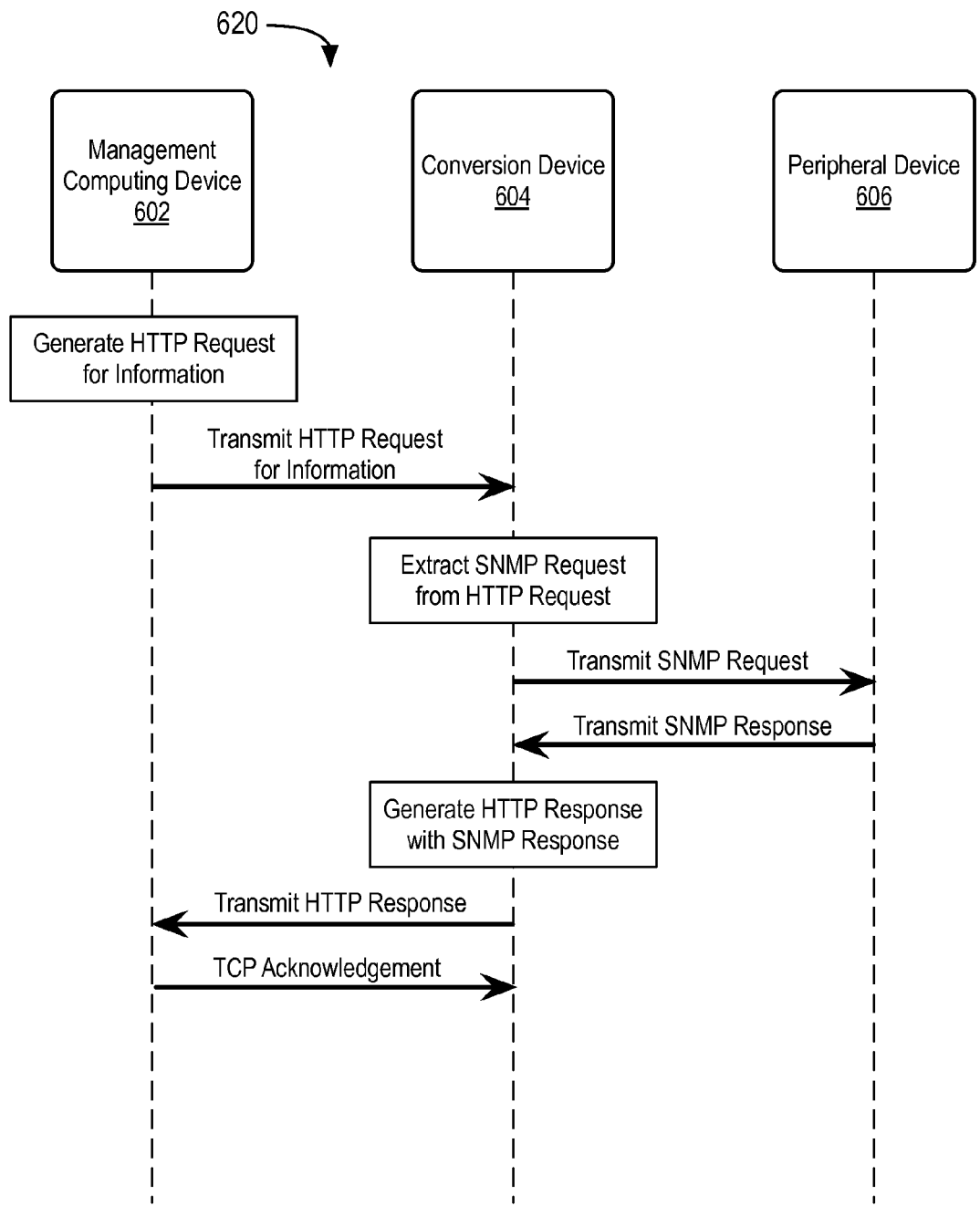
FIG. 6C is a data flow diagram illustrating an example operation of requesting for information using HTTP, according to an example embodiment.

FIG. 6C is a data flow diagram 620 illustrating an example operation of requesting for information using HTTP, according to an example embodiment. In this example, the management computing device 602 requests the peripheral device 606 for information. The information may be status information—such as operational health, supply levels, availability, or network information—or other kinds of information (e.g., serial number, firmware version, capabilities of the peripheral device, etc.).

First, the management computing device 602 generates an HTTP request for information. This step may first involve generating an SNMP message requesting the information, which is then encapsulated or encompassed within an HTTP message. Generating the SNMP request may involve accessing a management information base (MiB) and/or a peripheral device database in order to obtain information used to construct the SNMP PDU. In some implementations, the request for information may be a "GetRequest" SNMP PDU, among other possible kinds of messages.

Then, the management computing device 602 transmits the HTTP request for information to the conversion device 604. This step may involve establishing a TCP network connection, if no such connection is already established.

The conversion device 604 may then extract the SNMP request for information from the HTTP message. The conversion device may be designed to look for information enclosed within a particular set of HTML tags, for example. In some implementations, the HTTP message may include metadata indicating that the HTTP message contains an SNMP message embedded therein. For example, the HTTP message may include a tag indicating the SNMP PDU type (e.g., "<p>GetRequest</p>"). As another example, the HTTP message may include metadata specifying a URL that indicates that the HTTP message contains an embedded SNMP message (e.g., "http://device/SNMP"). Note that this example URL does not relate to any specific web address. Regardless of the particular implementation, the HTTP message may include some kind of metadata, tag, or other kind of information indicating that an SNMP message is embedded therein.

Once the SNMP request is extracted, the conversion device 604 may transmit the SNMP request to the peripheral device 606. In implementations where the conversion device 604 is a separate device from the peripheral device 606, this step may involve transmitting the SNMP request over UDP. In implementations where the conversion device 604 is integrated within the peripheral device 606, this step may involve transmitting the SNMP request via an internal bus.

Then, the peripheral device 606 responds to the request with an SNMP response containing the requested-for information. The conversion device 604 may then generate an HTTP response that includes the SNMP response and transmit that HTTP response back to the management computing device 602.

Figure 6D:
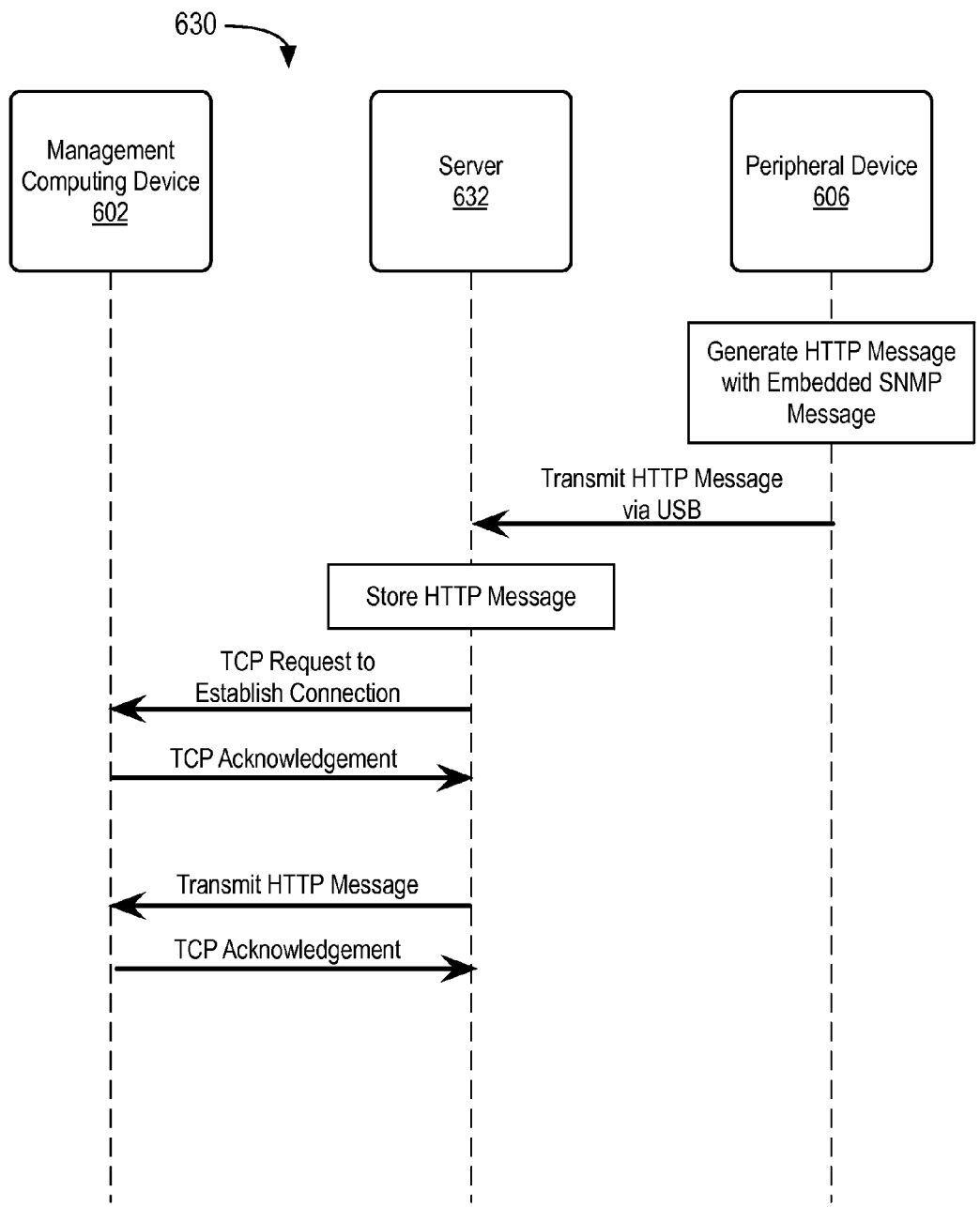
FIG. 6D is a data flow diagram illustrating an example operation of transmitting HTTP messages over USB, according to an example embodiment.

FIG. 6D is a data flow diagram 630 illustrating an example operation of transmitting HTTP messages over USB, according to an example embodiment. In this example, instead of using a network connection, the peripheral device 606 utilizes a serial bus connection and transmits HTTP messages over USB to server 632. The operations illustrated in data flow diagram 630 may be performed within system 420 shown in FIG. 4B, for example.

First, the peripheral device 606 generates an HTTP message that embeds an SNMP message therein. This may be performed in a variety of ways, as described above.

Then, the peripheral device transmits this HTTP message via a USB connection with the server 632. In some implementations, the USB connection may simulate an Ethernet connection. In this example scenario, the USB connection may facilitate the transferring of data instead of a TCP connection.

The server 632 may store the HTTP message in volatile memory and/or non-volatile memory. Then, the server 632 may establish a network connection with the management computing device 602 and subsequently transmit the HTTP message thereto.

In some cases, the server 632 may be connected via USB and/or a network connection to other peripheral devices. The server 632 may collect two or more HTTP messages before transmitting them in bulk to the management computing device 602. In some instances, the server 632 may wait until it collects a threshold number of messages before sending them to the management computing device; in other instances, the server 632 may periodically transmit any messages in bulk that it has collected over a period of time.

Note that, in the example operations depicted in FIG. 6A, FIG. 6B, and FIG. 6D, the peripheral device 606 may be polled for error messages, status information, and/or other information before sending the SNMP message to the conversion device 604. In other words, the peripheral device 606 may, in some implementations, wait for the management computing device 602 to establish the TCP connection and poll the peripheral device 606 for the requested-for information. If the management computing device 602 performs a normal SNMP query for information, the peripheral device 606 may include information within the HTTP message (e.g., within the HTTP header) indicating the type of SNMP message contained therein (e.g., text denoting that the HTTP message contains a TRAP SNMP message).

A request may be sent to the conversion device 604 and/or the peripheral device 606 for information associated with the peripheral device 606. As one example, the requested-for information may be status information. A response message or messages containing the status information may then be embedded within or otherwise serve as the basis for generating an HTTP message containing that status information. In some implementations, the response HTTP message may include, in addition to the status information, SNMP TRAP information stored on the peripheral device 606 and/or conversion device 604. A storage device incorporated within or otherwise associated with the peripheral device 606 may accumulate SNMP TRAP messages that are generated upon the occurrence of certain events on the peripheral device 606, such as errors. The SNMP TRAP messages may be stored until the management computing device 602 transmits a request for information to the peripheral device 606 and/or the conversion device 604. The peripheral device 606 may then send back a response message that includes both the requested-for information and the accumulated TRAP messages.

In some instances, if one or more SNMP TRAP messages have been generated and stored, the generated response HTTP message may include a token or header indicating that the peripheral device 606 has stored thereon the one or more SNMP TRAP messages. The token or header may be a text string or other form of data that informs the management computing device 602 that there are stored TRAP messages on the peripheral device 606. The management computing device 602 may, in response to receiving such a token or header, transmit another request to the peripheral device 606 for the stored SNMP TRAP message information.

Figure 6E:
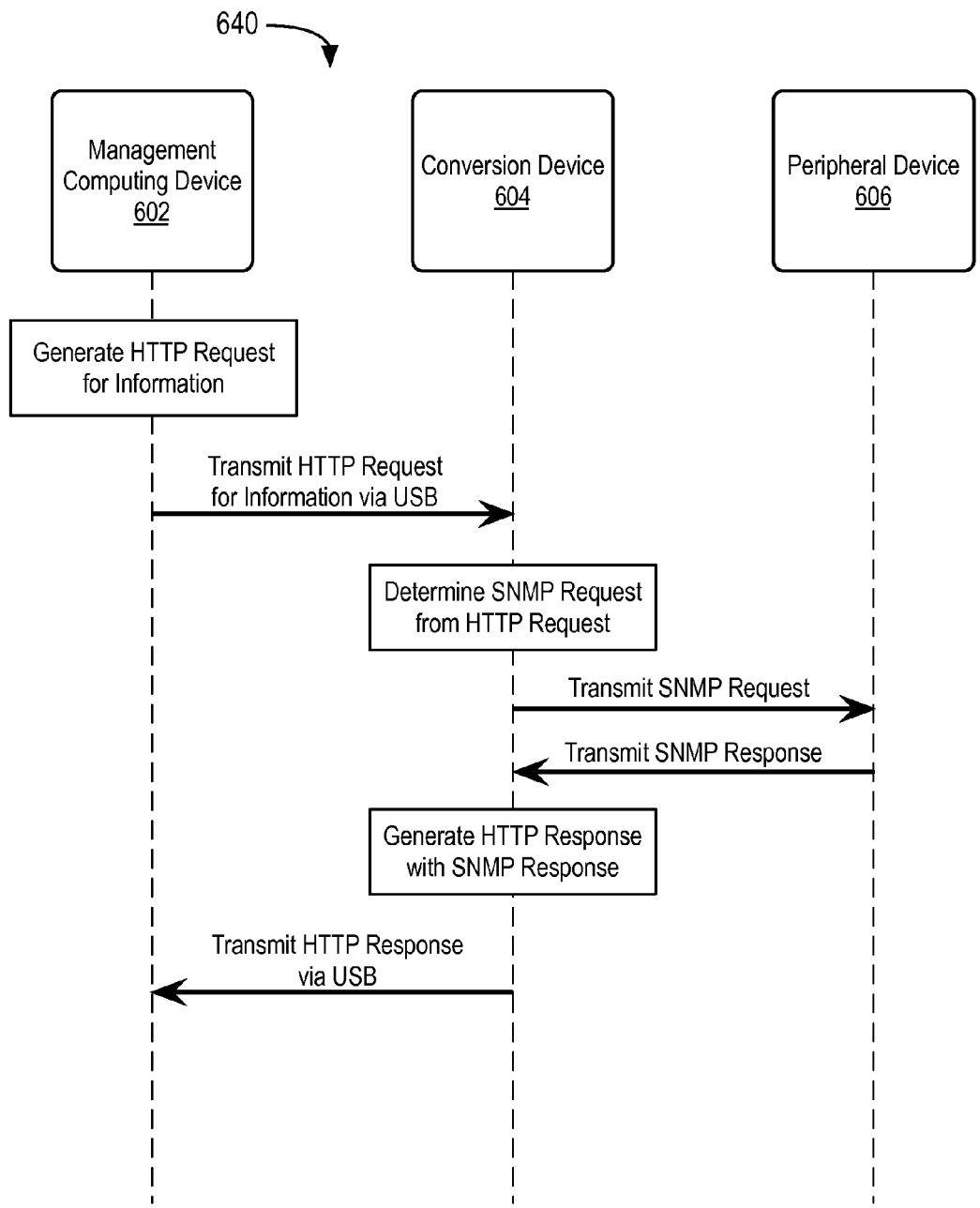
FIG. 6E is a data flow diagram 640 illustrating an example operation of transmitting HTTP messages over USB, according to an example embodiment.

FIG. 6E is a data flow diagram 640 illustrating an example operation of transmitting HTTP messages over USB, according to an example embodiment. The data flow diagram 640 depicts a substantially similar operation as that of data flow diagram 630 in FIG. 6D. Here, the management computing device 602 generates an HTTP request for information and transmits that request to the conversion device 604 via USB. The conversion device 604 then extracts or otherwise determines an SNMP request from the HTTP request. The request may be for any kind of information associated with the peripheral device 606, including status and/or error information, among other possible kinds of information. In some instances, the requested-for information is one or more TRAP SNMP messages.

The conversion device 604 then transmits the SNMP request for information to the peripheral device 606, which responds to the SNMP request by transmitting an SNMP response containing the requested-for information to the conversion device 604. Then, the conversion device 604 generates an HTTP response message that embeds therein or otherwise includes the SNMP response containing the requested-for information. The conversion device 604 then transmits the generated HTTP response to the management computing device 602 via USB.

Figure 6F:
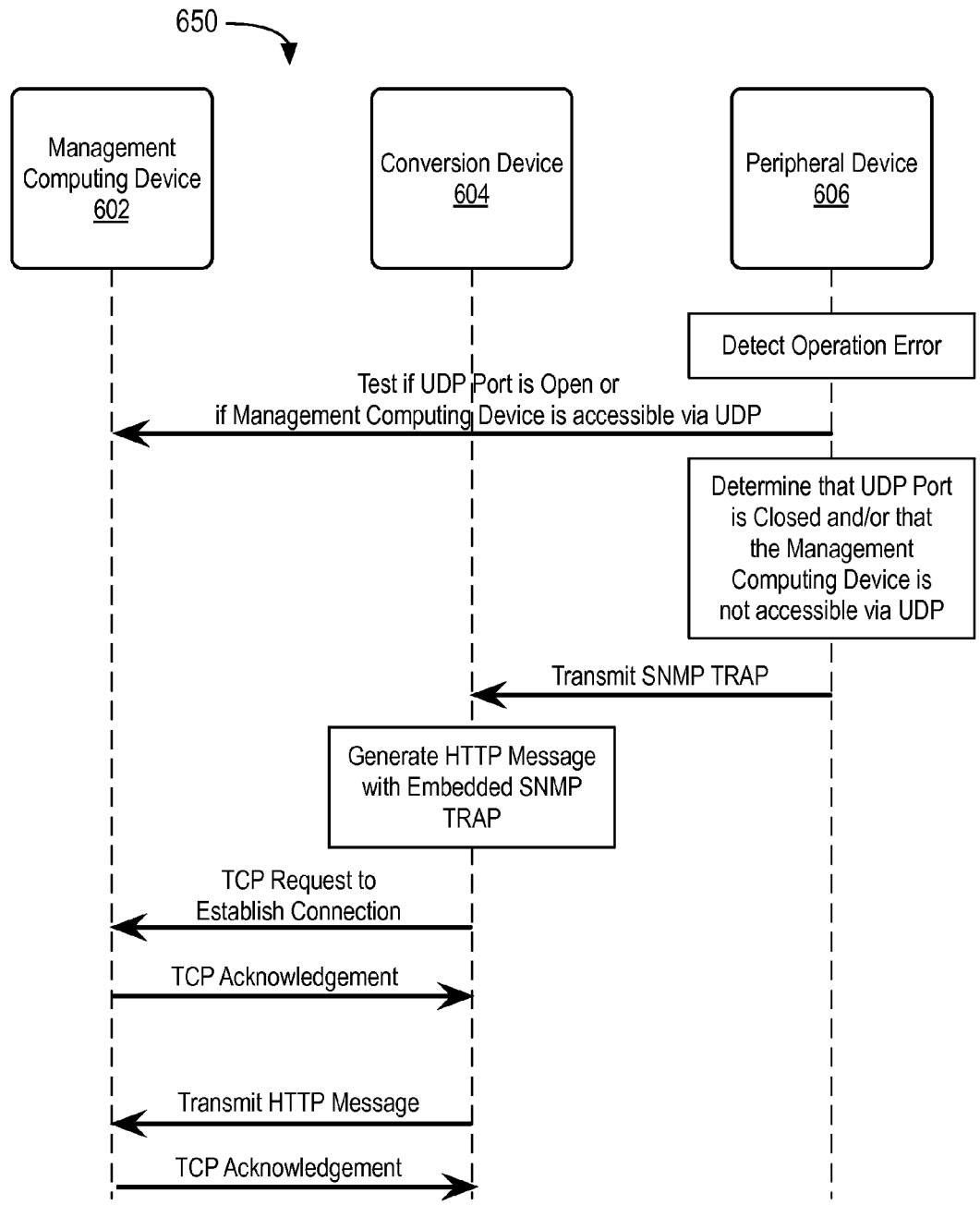
FIG. 6F is a data flow diagram 650 illustrating an example operation of dynamic port configuration, according to an example embodiment.

FIG. 6F is a data flow diagram 650 illustrating an example operation of dynamic port configuration, according to an example embodiment. In this example, the peripheral device attempts to transmit a message to the management computing device 602 over one protocol, determines that the first transmission failed, and then attempts to transmit the message over a different protocol.

First, the peripheral device 606 detects the occurrence of an operation error. Then, the peripheral device 606 determines whether or not a network port associated with UDP is open. Some network configurations may allow inbound and/or outbound traffic through one or more ports associated with UDP messaging. In such network configurations, the peripheral device may determine that the port is open and subsequently transmits an SNMP message indicating the occurrence of the operation error to the management computing device 602.

However, if the UDP port is closed and/or if the host is not accessible via UDP, the peripheral device may then transmit the SNMP message indicating the operation error to the conversion device 604. The conversion device 604 may then generate an HTTP message encapsulating the SNMP error message. Then, the conversion device 604 may establish a TCP network connection with the management computing device 602 and transmit the HTTP message—which contains the SNMP error message—to the management computing device 602. The TCP network connection may utilize a different port or ports than those required by UDP.

In this manner, the occurrence of an operation error at the peripheral device 606 may be communicated (or attempted to be communicated) over multiple protocols. Should the management computing device 602 be accessible over the first-attempted port, the message may be sent without any additional steps. However, if the network configuration blocks network traffic through a given port, the peripheral device 606—with the aid of the conversion device 604—may still be able to transmit the message by going through ports that are open.

In some implementations, the peripheral device 606 and/or the conversion device 604 may be able to test the availability of ports to determine which ports are open within the network. The peripheral device 606 may identify one or more open ports to be open. The peripheral device 606 may select the appropriate application protocol and/or transport protocol based on the ports determined to be open.

Note that, from the perspective of the peripheral device 606, the management computing device 602 may or may not be accessible via UDP. The management computing device 602 may be inaccessible via UDP for a variety of reasons, such as the UDP port being closed, blocked, firewalled, and/or not authorized for use by the peripheral device 606. In other scenarios, all UDP network traffic may be blocked or otherwise disabled within a network. Regardless of the specific reason, the peripheral device 606 may determine that communication with the management computing device 602 cannot be performed.

Figure 6G:
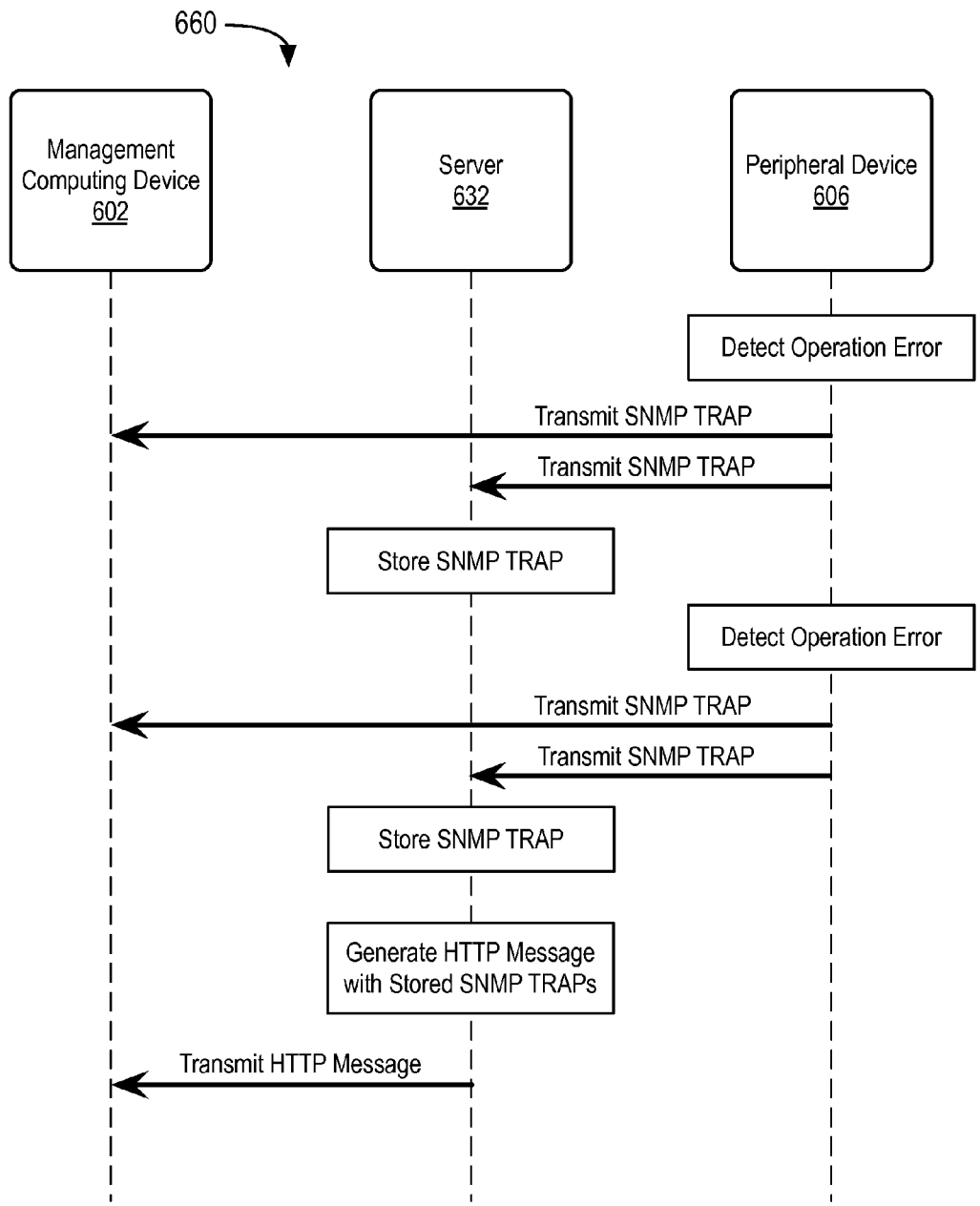
FIG. 6G is a data flow diagram 660 illustrating an example operation of multi-protocol messaging, according to an example embodiment.

FIG. 6G is a data flow diagram 660 illustrating an example operation of multi-protocol messaging, according to an example embodiment. In this example, the peripheral device 606 may transmit messages over multiple protocols, regardless of whether the management computing device 602 receives the messages over a given protocol.

First, the peripheral device 606 detects the occurrence of an operation error. Upon detecting the error, the peripheral device 606 transmits an SNMP message to both the management computing device 602 and the server 632. The SNMP message may be an SNMP TRAP message, for example. The management computing device 602 may or may not receive the SNMP message, depending on whether the requisite ports are open, whether the packet is dropped, and/or whether the management computing device 602 is capable of receiving SNMP messages via UDP. The server 632 may be configured to receive SNMP messages from the peripheral device 606. The server 632 may then store the received SNMP message on a local memory device.

At a later time, another error may occur at the peripheral device 606, which then repeats the above-described process.

Although the data flow diagram 660 shown in FIG. 6G shows two SNMP TRAP messages being stored on the server 632 before being transmitted to the management computing device 602, fewer or more messages may be stored on the server 632 before being transmitted to the management computing device 602. In some embodiments, the management computing device 602 may poll the server 632 for stored SNMP TRAP messages periodically in order to retrieve the stored SNMP TRAP information (in the form of an HTTP message). In configurations where the polling occurs frequently—which would provide "timely" TRAP information to the management computing device 602—few or no SNMP TRAP messages may accumulate between consecutive polls. Frequent polling may be desired in order to keep the management computing device 602 informed of occurrences of errors.

Then, the server 632—which has stored thereon at least the two SNMP messages—generates an HTTP message that encapsulates the stored SNMP messages. The server 632 may then transmit the HTTP message containing the two or more SNMP messages to the management computing device 602.

In this manner, successful transmission of the messages is a priority. Certain messages may be received more than once at the management computing device 602. However, this redundancy may be desired in circumstances where reliability is of paramount importance. Additionally, the management computing device 602 may be both asynchronously notified of the occurrence of errors (e.g., as they occur) and synchronously informed of the occurrences of errors over a given time period.

In some instances, the server 632 does not transmit the HTTP message until the management computing device 602 polls the server 632 for the HTTP message. The management computing device 602 may first establish the TCP connection with the server 632 and subsequently send an HTTP request for the stored SNMP data. Then, the server 632 may respond by transmitting the HTTP message, via the previously established TCP connection, to the management computing device 602.

The example set of operations shown in FIG. 6G may be performed in order to overcome potential issues caused by a firewall or other kinds of network security. The peripheral device 606 may attempt to connect to and/or transmit information to the management computing device 602, but fail because of such a firewall or other security. By collecting the SNMP messages at server 632 (or on peripheral device 606 or conversion device 604), the messages may be stored until they can be retrieved by the management computing device 602 requesting that information. The management computing device 602 may not experience issues with the firewall or other network security, or may be otherwise authorized to communicate over given protocols and/or ports, such that it may be permitted to poll for the stored SNMP messages.

It should be understood that peripheral device 606 and server 632 may be integrated within a single physical device. For example, a peripheral device 606 may include a processor, storage, and/or memory that implements the functionality of server 632 as described herein.

Figure 6H:
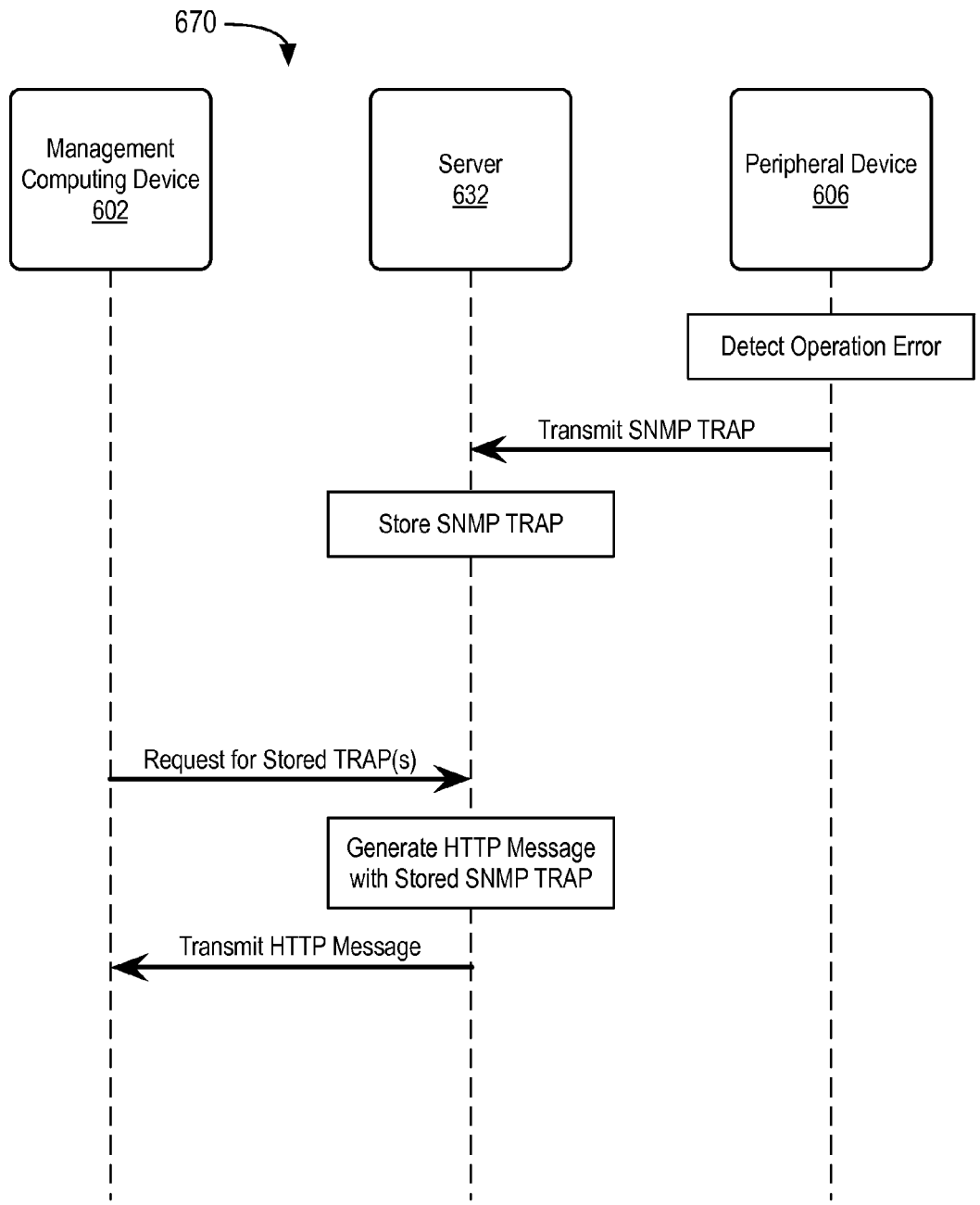
FIG. 6H is a data flow diagram 670 illustrating an example operation of multi-protocol messaging, according to an example embodiment.

FIG. 6H is a data flow diagram 670 illustrating an example operation of multi-protocol messaging, according to an example embodiment. The data flow diagram 670 depicts a substantially similar operation as that of data flow diagram 660 in FIG. 6G. Here, the peripheral device 606 detects an occurrence of an operation error and subsequently transmits an SNMP TRAP message to the server 632. The server 632 stores that SNMP TRAP information. The server 632 may receive additional SNMP TRAP messages and continue to accumulate information related to one or more received SNMP TRAP messages over a period of time.

Then, the management computing device 602 may send the server 632 a request for stored TRAP information. In this example, the server 632 responsively generates an HTTP message that contains information associated with the stored one or more SNMP TRAP messages. Then, the server 632 transmits a response to the request for stored TRAP information, which includes the generated HTTP message containing information associated with the stored SNMP TRAP information.

It should be understood that information associated with the SNMP TRAP messages stored on the server 632 may either be sent by the server 632 periodically and/or in response to receiving a request for that information.

Figure 6I:
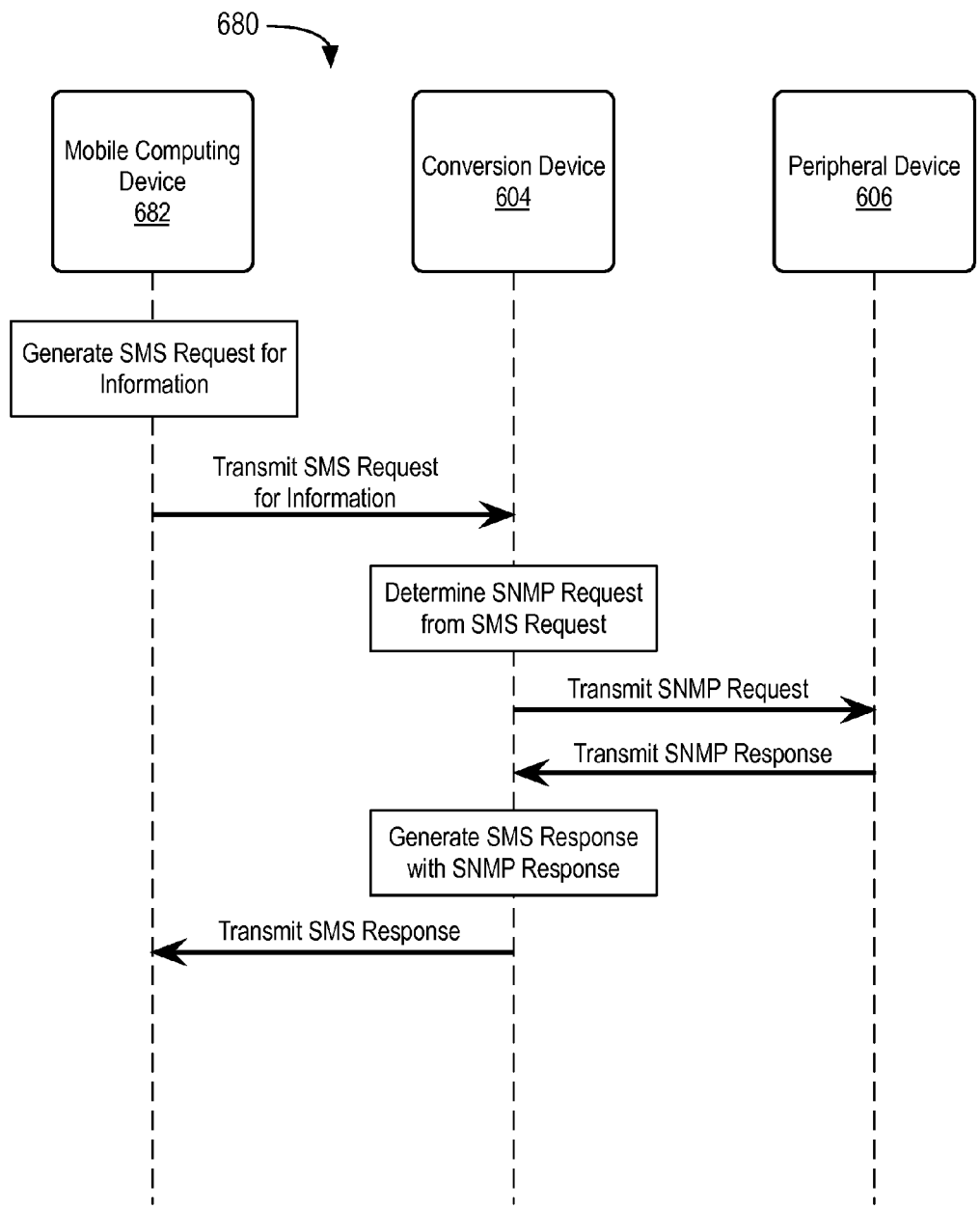
FIG. 6I is a data flow diagram illustrating an example operation of mobile device messaging, according to an example embodiment.

FIG. 6I is a data flow diagram 680 illustrating an example operation of mobile device messaging, according to an example embodiment. In this example, a mobile computing device 682 requests information (e.g., status information) from the peripheral device 606.

First, the mobile computing device 682 generates an SMS request for information. The SMS request for information may contain shorthand text and/or an assigned keyword or words specifying the type of information it is requesting (e.g., "status information").

Then, the mobile computing device 682 may transmit the SMS request to the conversion device 604. This step may involve transmitting the SMS packet to a mobile station (e.g., a cellular network tower), which may be connected to a network (e.g., the Internet). The conversion device may be communicatively connected to the mobile station, such that it is capable of receiving SMS messages sent to a particular cellular number.

Upon receiving the SMS request, the conversion device 604 may then determine the SNMP request corresponding to the SMS request. The conversion device 604 may contain a database or table stored thereon that associates certain keywords or phrases with a particular type of request. Once the particular type of request is determined, the conversion device 604 may then generate the SNMP request that reflects the type of message prescribed by the SMS message.

Then, the conversion device 604 transmits the generated SNMP request to the peripheral device 606. The peripheral device 606 then responds with an SNMP message containing the requested-for information. Once that response is received, the conversion device 604 then generates an SMS response based on the received SNMP message. For example, if the requested-for information was the serial number of the peripheral device 606, the SMS response may contain text representative of that serial number. Then, the conversion device 604 transmits the SMS response to the mobile computing device 682 (e.g., via a mobile station).

In this manner, a technician or serviceperson may retrieve information about the peripheral device 606 without requiring a desktop computer or laptop.

Although the examples above refer to specific application layer protocols and transport layer protocols, other protocols and/or standards may be employed as well. The above-described techniques may be applied in a variety of other implementations not specifically disclosed herein. Each of the data flow diagrams depicted in FIGS. 6A-6I are example operations; some operations or methods may contain fewer or additional steps. Furthermore, steps or operations from two or more of the data flow diagrams shown in FIGS. 6A-6I may be combined.

V. Variations

In some scenarios, a peripheral device may not be aware of which ports are open and which are closed within its network environment. In some embodiments, the peripheral device may test the availability of various ports within the network to determine which protocol or protocols to employ. The peripheral device may configure itself accordingly, such that the test only needs to be performed during an initial configuration (or periodically).

In some cases, a network administrator may wish to configure the peripheral device based on his or her knowledge of the availability of ports and/or protocols within the network. A peripheral device may be configured manually in order to select the desired ports and/or protocols through which the peripheral device sends and receives messages.

In some cases, a peripheral device may send messages over UDP to a management computing device asynchronously. The management computing device may be configured to transmit UDP acknowledgement messages in response, indicating that it has successfully received a particular UDP message from the peripheral device. In these scenarios, the peripheral device may keep track of which UDP messages were received successfully at the management computing device (based on the received acknowledgements). At a later point in time, the peripheral device may generate an HTTP message that includes a bulk set of SNMP messages that were not successfully sent over UDP. That HTTP message may then be transmitted through a more reliable TCP connection to the management computing device.

In some scenarios, the particular protocol employed by either the management computing device and/or peripheral device may be based on the size of a particular message. Small-sized messages (i.e., those with little data) may be transmitted as SNMP messages over UDP, while larger messages (i.e., those with more data) may be transmitted as HTTP messages over TCP. In some implementations, a threshold data size may be set, such that messages under a certain size are sent as SNMP messages, while messages equal to or over that threshold size are sent as HTTP messages.

In some implementations, HTTP messages may be encrypted prior to transmission and then subsequently decrypted at the receiving device. Some configurations may utilize HTTP Secure (HTTPS) in order to facilitate the encryption and decryption of messages. In other configurations, certain protocols may be layered with or used in conjunction with HTTP in order to bolster the security of the communication over TCP (e.g., using SSL or TLS, among other possible protocols).

VI. Conclusion

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

What is claimed is:

1. A method comprising:
   establishing a network connection between a management computing device and a peripheral device, wherein the network connection utilizes a particular transport protocol;
   generating, at the management computing device, a first message that represents a request for information from a peripheral device, wherein the first message is in a format compatible with a first application protocol;
   generating, at the management computing device, a second message based on the first message, wherein the second message is in a format compatible with a second application protocol, and wherein the second application protocol is configured to communicate over the particular transport protocol; and
   transmitting, by the particular transport protocol, the second message from the management computing device to the peripheral device.

2. The method of claim 1, further comprising:
   upon not receiving, within a predetermined length of time since transmitting the second message, an acknowledgement response indicating that the peripheral device received the second message, repeating the step of transmitting, by the particular transport protocol, the second message from the management computing device to the peripheral device over the particular transport protocol.

3. The method of claim 1, further comprising:
   receiving, through the second application protocol, a response message from the peripheral device over the particular transport protocol, wherein the response message is in a format compatible with the second application protocol; and
   extracting, from the response message, a status message representative of information associated with the peripheral device, wherein the status message is in a format compatible with the first application protocol.

4. The method of claim 1, further comprising:
   upon receiving, within a predetermined length of time, an acknowledgement response indicating that the peripheral device received the second message, closing the network connection between the management computing device and the peripheral device.

5. The method of claim 1, wherein establishing the network connection comprises:
   providing a serial bus connection between the management computing device and the peripheral device, wherein the serial bus connection is configured to transmit messages in a format compatible with the second application protocol using the particular transport protocol; and
   opening a connection, using the particular transport protocol, between the management computing device and the peripheral device.

6. The method of claim 1, wherein generating the second message comprises:
   embedding the first message within the second message, wherein the second message also comprises information indicating that the second message has embedded therein a message in a format compatible with the first application protocol.

7. The method of claim 6, wherein embedding the first message within the second message comprises:
   embedding the first message within a body of the second message,
   wherein the information indicating that the first message has embedded therein a message in a format compatible with the first application protocol is a header of the second message, wherein the header comprises text indicative of the first application protocol.

8. The method of claim 1, further comprising:
   based on determining that the management computing device and the peripheral device are both within a common local network, transmitting, by a different transport protocol, the first message from the management computing device to the peripheral device.

9. The method of claim 1, wherein the first application protocol is a simple network management protocol (SNMP), wherein the second application protocol is a hypertext transfer protocol (HTTP), and wherein the particular transport protocol is a transmission control protocol (TCP).

10. A system comprising:
    a management computing device; and
    a peripheral device configured to perform operations comprising:
        receiving a request to establish a network connection between the peripheral device and the management computing device, wherein the network connection utilizes a particular transport protocol;
        receiving, from the management computing device, a second message in a format compatible with a second application protocol, wherein the second application protocol is configured to communicate over the particular transport protocol;
        determining that the second message contains a first message embedded therein, wherein the first message represents a request for information associated with the peripheral device, and wherein the first message is in a format compatible with a first application protocol;
        upon determining that the second message contains the first message indicative of the request for information, generating a third message comprising the information associated with the peripheral device, wherein the third message is in a format compatible with the first application protocol;
        generating a fourth message based on the third message, wherein the fourth message is in a format compatible with the second application protocol; and
        transmitting, by the particular transport protocol, the fourth message from the peripheral device to the management computing device.

11. The system of claim 10, wherein the operations further comprise:
    upon not receiving, within a predetermined length of time since transmitting the fourth message, an acknowledgement response indicating that the management computing device received the fourth message, repeating the step of transmitting, by the particular transport protocol, the fourth message from the peripheral device to the management computing device.

12. The system of claim 10, wherein establishing the network connection comprises:
    providing a serial bus connection between the peripheral device and the management computing device, wherein the serial bus connection is configured to transmit messages in a format compatible with the second application protocol using the particular transport protocol; and
    opening a connection, using the particular transport protocol, between the management computing device and the peripheral device.

13. The system of claim 10, wherein the management computing device is configured to close the network connection between the peripheral device and the management computing device upon receiving the fourth message.

14. The system of claim 10, wherein generating the fourth message comprises:
   embedding the third message within the fourth message, wherein the fourth message includes information indicating that the fourth message has embedded therein a message in a format compatible with the first application protocol.

15. A peripheral device comprising:
   a network interface configured to provide a network connection between the peripheral device and a management computing device, wherein the network connection utilizes at least a particular transport protocol;
   a storage device; and
   at least one processor configured to execute instructions that cause the peripheral device to perform the following operations:
      detecting one or more occurrences of operation errors on the peripheral device and responsively generating one or more first messages, wherein the one or more first messages are in a format compatible with a first application protocol, and wherein a given first message includes information specifying a type of operation error that occurred;
      storing the one or more first messages on the storage device;
      upon receiving a request for the one or more first messages, generating a second message based on the one or more first messages, wherein the second message is in a format compatible with a second application protocol, wherein the second application protocol is configured to communicate over the particular transport protocol;
      transmitting, by the particular transport protocol, the second message from the peripheral device to the management computing device.

16. The peripheral device of claim 15, wherein the operations further comprise:
   upon receiving a request to open a connection from the management computing device, establishing the network connection between the peripheral device and the management computing device.

17. The peripheral device of claim 15, wherein the operations further comprise:
   upon receiving a request for information from the management computing device, generating a response message, wherein the response message includes a header indicating that the peripheral device has the one or more first messages stored on the storage device, and wherein the response message is in a format compatible with the second application protocol; and
   transmitting, by the particular transport protocol, the response message from the peripheral device to the management computing device.

18. The peripheral device of claim 17, wherein the response message further includes information associated with the peripheral device indicative of an operational state of the peripheral device, wherein the information is in a format compatible with the first application protocol.

19. The peripheral device of claim 15, wherein generating a second message based on the one or more first messages comprises:
   embedding the one or more first messages within the second message, wherein the second message also comprises information indicating that the second message has embedded therein a message in a format compatible with the first application protocol.

20. The peripheral device of claim 15, wherein the operations further comprise:
   upon receiving a response from the management computing device indicating that the management computing device received the second message, removing the one or more first messages from the storage device.

\* \* \* \* \*